(12) United States Patent
Uselton

(10) Patent No.: US 12,247,948 B1
(45) Date of Patent: Mar. 11, 2025

(54) HEIGHT ADJUSTABLE INSPECTION SHOES, APPARATUS AND METHODS FOR INSPECTING TUBULARS

(71) Applicant: SCAN SYSTEMS, CORP, The Woodlands, TX (US)

(72) Inventor: Danny Uselton, Spring, TX (US)

(73) Assignee: SCAN SYSTEMS, CORP., The Woodlands, TX (US)

( * ) Notice: Subject to any disclaimer, the term of this patent is extended or adjusted under 35 U.S.C. 154(b) by 150 days.

(21) Appl. No.: 18/186,843

(22) Filed: Mar. 20, 2023

(51) Int. Cl.
*G01N 27/90* (2021.01)
*G01N 27/87* (2006.01)
*G01N 27/9013* (2021.01)
*G01N 27/904* (2021.01)
*G01N 27/9093* (2021.01)

(52) U.S. Cl.
CPC ......... *G01N 27/9093* (2013.01); *G01N 27/87* (2013.01); *G01N 27/9026* (2013.01); *G01N 27/904* (2013.01)

(58) Field of Classification Search
CPC ............... G01N 27/9093; G01N 27/87; G01N 27/9026; G01N 27/904
See application file for complete search history.

(56) References Cited

U.S. PATENT DOCUMENTS

| | | | |
|---|---|---|---|
| 2,563,254 | A | 8/1951 | Lewis |
| 3,437,917 | A | 4/1969 | Gunkel et al. |
| 3,539,915 | A | 11/1970 | Walters et al. |
| 3,568,049 | A | 3/1971 | Barton |

(Continued)

FOREIGN PATENT DOCUMENTS

| | | |
|---|---|---|
| DE | 3729743 A1 | 3/1989 |
| JP | S61277051 A | 12/1986 |

(Continued)

OTHER PUBLICATIONS

AN9003—A User's Guide to Intrinsic Safety, retrieved from the Internet Jul. 12, 2017.

(Continued)

*Primary Examiner* — Giovanni Astacio-Oquendo
*Assistant Examiner* — Zannatul Ferdous
(74) *Attorney, Agent, or Firm* — Jeffrey L. Wendt; THE WENDT FIRM, P.C.

(57) ABSTRACT

Tubular member electromagnetic inspection apparatus, systems and methods for inspecting tubulars. An EMI shoe includes a generally arcuate body having a non-working major face, a working major face, a trough configured to hold one or more sensors embedded in a potting material, and at least one through hole for mechanical connection to an EMI apparatus. The generally arcuate body includes at least one non-central through hole in which are positioned respective externally threaded cylindrically-shaped set screws, each of the at least one non-central through holes having a wear-resistant friction member movably secured therein and positioned such that a distal portion of each wear-resistant friction member protrudes away from the major working face an initial distance (d1) and configured to wear down over time to a generally arcuate surface that is a distance d2 from the major working face, where d2<d1, forming a degraded wear-resistant member.

24 Claims, 9 Drawing Sheets

(56) References Cited

U.S. PATENT DOCUMENTS

| | | | |
|---|---|---|---|
| 3,710,236 | A | 1/1973 | Halsey et al. |
| 3,958,049 | A | 5/1976 | Payne |
| 4,058,762 | A | 11/1977 | Holt et al. |
| 4,217,548 | A | 8/1980 | Furukawa et al. |
| 4,218,651 | A | 8/1980 | Ivy |
| 4,378,072 | A | 3/1983 | Appleman |
| 4,465,829 | A | 8/1984 | Graves |
| 4,503,393 | A | 3/1985 | Moyer et al. |
| 4,510,447 | A | 4/1985 | Moyer |
| 4,534,405 | A | 8/1985 | Hulek |
| 4,585,826 | A | 4/1986 | Graves |
| 4,602,212 | A | 7/1986 | Hiroshima et al. |
| 4,629,991 | A | 12/1986 | Wheeler |
| 4,675,604 | A | 6/1987 | Moyer |
| 4,739,273 | A | 4/1988 | Peterson et al. |
| 4,912,410 | A | 3/1990 | Morley |
| 4,916,394 | A | 4/1990 | Thompson |
| 5,007,291 | A | 4/1991 | Walters et al. |
| 5,030,911 | A | 7/1991 | Lam |
| 5,142,230 | A | 8/1992 | Nottingham |
| 5,157,977 | A | 10/1992 | Grubbs |
| 5,446,382 | A | 8/1995 | Flora |
| 5,595,703 | A | 1/1997 | Swaelens et al. |
| 5,671,155 | A | 9/1997 | Edens et al. |
| 5,914,596 | A | 6/1999 | Weinbaum |
| 5,943,632 | A | 8/1999 | Edens et al. |
| 6,316,937 | B1 | 11/2001 | Edens |
| 6,558,606 | B1 | 5/2003 | Kulkarni et al. |
| 6,580,268 | B2 | 6/2003 | Wolodko |
| 6,745,136 | B2 | 6/2004 | Lam et al. |
| 6,797,351 | B2 | 9/2004 | Kulkarni et al. |
| 6,912,097 | B2 | 6/2005 | Woods |
| 6,924,640 | B2 | 8/2005 | Fickert et al. |
| 7,038,445 | B2 | 5/2006 | Walters et al. |
| 7,107,154 | B2 | 9/2006 | Ward |
| 7,153,135 | B1 | 12/2006 | Thomas |
| 7,184,150 | B2 | 2/2007 | Quadling et al. |
| 7,337,673 | B2 | 3/2008 | Kennedy et al. |
| 7,346,455 | B2 | 3/2008 | Ward et al. |
| 7,397,238 | B2 | 7/2008 | Walters et al. |
| 7,560,920 | B1 | 7/2009 | Ouyang et al. |
| 7,622,917 | B2 | 11/2009 | Walters et al. |
| 7,640,811 | B2 | 1/2010 | Kennedy et al. |
| 7,795,864 | B2 | 9/2010 | Barolak et al. |
| 8,020,460 | B1 | 9/2011 | Hoyt |
| 8,165,711 | B2 | 4/2012 | Brooking et al. |
| 8,285,411 | B2 | 10/2012 | Hull et al. |
| 8,605,136 | B2 | 12/2013 | Yu et al. |
| 9,097,081 | B2 | 8/2015 | Biddick |
| 9,506,895 | B2 * | 11/2016 | Gogol, Jr. ............ H10N 30/875 |
| 9,522,054 | B2 | 12/2016 | Kim et al. |
| 9,879,131 | B2 | 1/2018 | Bedard et al. |
| 10,082,485 | B2 | 9/2018 | Uhlig et al. |
| 10,767,470 | B2 | 9/2020 | Fouda et al. |
| 11,307,173 | B1 | 4/2022 | Uselton et al. |
| 11,402,351 | B1 | 8/2022 | Uselton et al. |
| 11,402,352 | B1 | 8/2022 | Uselton et al. |
| 2007/0024278 | A1 | 2/2007 | Walters et al. |
| 2010/0056899 | A1* | 3/2010 | Toddes ................... G01R 33/30 |
| | | | 119/729 |
| 2012/0265053 | A1* | 10/2012 | Rohr ....................... A61B 5/055 |
| | | | 600/415 |
| 2018/0103979 | A1* | 4/2018 | Arimitsu ............ A61B 10/0233 |
| 2018/0196005 | A1 | 7/2018 | Fanini et al. |
| 2020/0040674 | A1 | 2/2020 | McKenzie |

FOREIGN PATENT DOCUMENTS

| | | |
|---|---|---|
| JP | S63221239 A | 9/1988 |
| JP | S6447944 A | 2/1989 |
| JP | H01110251 | 4/1989 |
| JP | H01232254 A | 9/1989 |
| JP | H02253152 A | 10/1990 |
| JP | H06148139 A | 5/1994 |
| JP | 2000081419 A | 3/2000 |
| JP | 2014044087 A | 3/2014 |

OTHER PUBLICATIONS

Buckley, J.M., "An introduction to Eddy Current Testing theory and technology", pp. 1-7, Dec. 29, 1998, place of publication unknown, retrieved from the Internet Jun. 13, 2019.

Walters et al., "Using Magnetic Flux Density to Identify Anomalies in Pipe Wall Thickness", pp. 1-21, Dec. 23, 2005, place of publication unknown, retrieved from the Internet Nov. 19, 2012.

Staff report, Hydraulics & Pneumatics, "Fundamentals of quick-acting couplings", pp. 1-12, Jan. 1, 2012, place of publication unknown, retrieved from the Internet May 14, 2019.

HARCO Metal Products Inc., "Telescoping Tube", 1 page, 2013, place of publication unknown, retrieved from the Internet May 13, 2019.

Stanley, R. K., "Electromagnetic Inspection of Carbon Steel Tubes", pp. 1-10, 1998, ASME NDE Group Conference, San Antonio, TX, published by NDE Information Consultants, Houston, Texas.

Jain, N., "The Rebirth of Eddy Current Nondestructive Testing", Quality Magazine, pp. 1-5, Aug. 11, 2014.

Niese et al., "Wall Thickness Measurement Sensor for Pipeline Inspection using EMAT Technology in Combination with Pulsed Eddy Current and MFL", ECNDT 2006—Tu.3.1.5, pp. 1-10, published by ECNDT (2006).

Yang, et al., "Inspection and Identification of Inner-Outer Defects on Oil-gas Pipeline", 17th World of. on Nondestructive Testing, Oct. 25-28, 2008, Shanghai, China, Chinese Society for Nondestructive Testing, Shanghai, China, downloaded from the Internet May 4, 2022, url: https://www.ndt.net/search/docs.php3?id=6673&file=article/wcndt2008/papers/487.pdf.

United States Patent & Trademark Office, Non-Final Office Action dated Feb. 1, 2022 in U.S. Appl. No. 16/987,221, now U.S. Pat. No. 11,402,352, 76 pages.

Scan Systems, Corp., Amendment and Response to United States Patent & Trademark Office, Non-Final Office Action dated Feb. 1, 2022 in U.S. Appl. No. 16/987,221, now U.S. Pat. No. 11,402,352, Apr. 16, 2022, 25 pages.

United States Patent & Trademark Office, Notice of Allowance dated May 6, 2022 in U.S. Appl. No. 16/987,221, now U.S. Pat. No. 11,402,352, 43 pages.

United States Patent & Trademark Office, Non-Final Office Action dated Apr. 12, 2023 in U.S. Appl. No. 17/869,146, 81 pages.

Cast Nylons Limited, NYCAST Safety Data Sheet, Aug. 11, 2020, p. 1-10.

Alro, Nyloil (Cast Nylons) Technical Data Sheet, Apr. 29, 2011, 1 page.

* cited by examiner

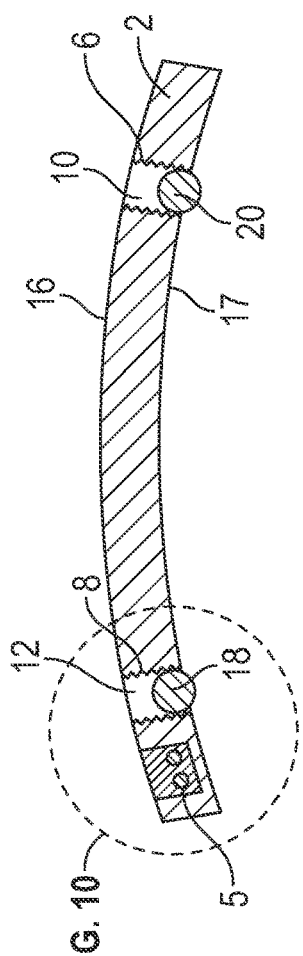
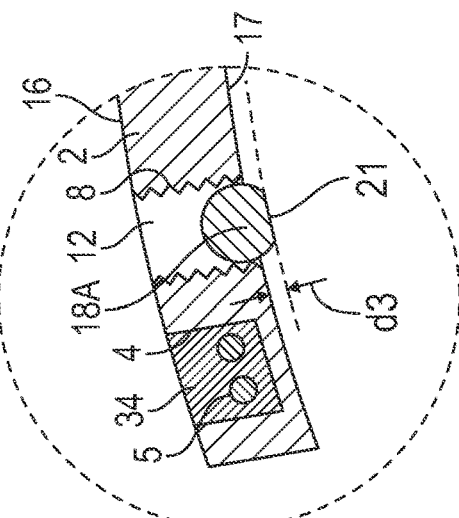
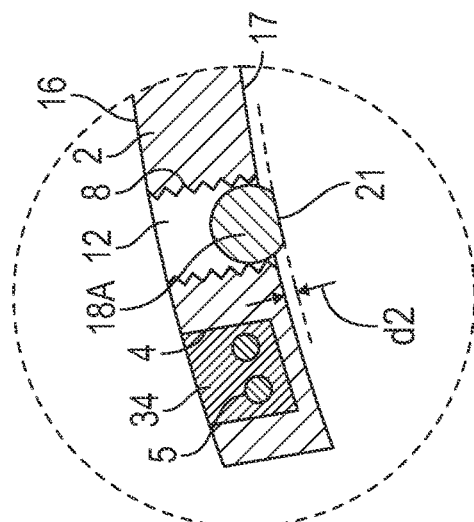
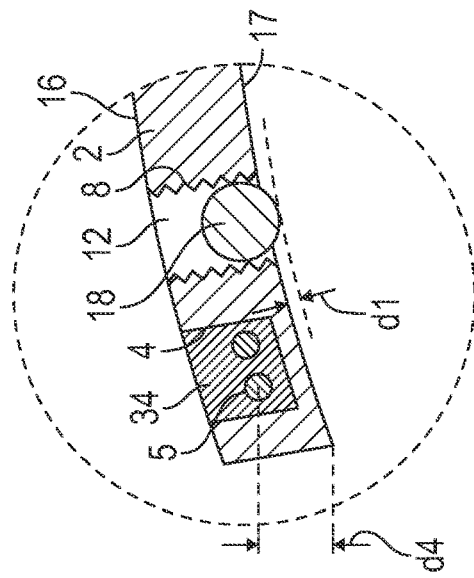

HEIGHT ADJUSTABLE INSPECTION SHOES, APPARATUS AND METHODS FOR INSPECTING TUBULARS

BACKGROUND INFORMATION

Technical Field

The present disclosure relates to apparatus, systems, and methods useful for testing the quality of tubular goods (hollow or solid), particularly automated inspection of tubular goods (sometimes referred to in the oil & gas industry as "oil country tubular goods", and herein sometimes as simply "OCTG").

Background Art

As noted in assignee's previous U.S. Pat. Nos. 7,397,238, 7,622,917, and 11,402,352, electromagnetic inspection (EMI) of metal pipe or solid metal tubular members by magnetic means conventionally involves magnetizing the member to create a magnetic field which extends circumferentially and is characterized by lines of magnetic flux which extend either axially of the tubular member or generally perpendicular to its axis, dependent on the manner by which magnetism is induced. While permanent magnets may be used, in many of the present systems, current flow through a wire coil positioned about the tubular member forms magnetic lines of flux through the opening of the coil which extend axially of the member under inspection. In other systems, current flows axially of the tubular member within the wall thereof so as to create a magnetic field, the lines of flux of which extend circumferentially about the tubular member in an orientation substantially perpendicular to the tubular member longitudinal axis. The presence of structural flaws or anomalies in the wall of the tubular member, such as surface nicks or pits, cracks, voids, or various crystalline discontinuities, disturbs the uniformity of a magnetic field in the wall of the tubular member. Accordingly, the structural integrity of the tubular member and its relative freedom of such flaws may be inspected by sensing and detecting the magnetic field variations with sensors disposed closely adjacent the surface of the tubular member.

The sensing of variations in a magnetic field in a pipe wall is customarily achieved by passing or moving an induction coil or similar device through the magnetic field and any magnetic field variations to induce voltages in the coil indicative of the magnetic field variations. The voltages or voltage signals may then be transmitted to appropriate recording and processing equipment. For optimum detection sensitivity and for detection of very small cracks in a pipe wall which can be a few thousandths of an inch in depth, and as explained in U.S. Pat. No. 4,916,394, it is necessary that the detecting or sensor coil be placed closely adjacent the exterior surface of the tubular member. Normally the adjacent coil is disposed from 0.002 inches (0.051 mm) to 0.020 inches (0.51 mm) relative to the surface of the tubular member with an axis of the coil substantially perpendicular to the surface. In the longitudinal sensor shoes described in the '394 patent, one or more sensor coils are mounted in a recess that extends longitudinally in a non-magnetic longitudinal support, such as brass, using a potting material such as epoxy. The brass support is provided with a thin magnetically transparent shim (such as stainless steel) covering the sensor coils, and a pair of wear-resistant contact members are attached to the shim. Note that the wear-resistant contact members are held in a shoe holder, not in the brass support or shoe body itself. The wear-resistant contact members are made, for example, of tungsten carbide or beryllium-copper alloy, adapted to contact with the surface of the tubular member in a manner so that the sensing coils are supported closely adjacent the surface of the tubular member at an optimum distance or spacing. The coils are protected from direct contact with the surface of the pipe by means of the thin shim of stainless steel. In certain sensor shoes available today, one or more sensor coils are mounted in a recess in a brass support using a potting material such as epoxy, and the brass support is coated with a thin magnetically transparent tungsten carbide coating configured to contact with the surface of the tubular member in a manner so that the sensing coils are supported closely adjacent the surface of the tubular member at an optimum distance or spacing. It is also known to use hard, non-flexible plastic shoe supports. Another technique is to use threaded wear pins having hard, wear resistant tips (ceramic, refractory metal, or other wear resistant nonmagnetic material) such as the longitudinal sensor shoes disclosed in U.S. Pat. No. 3,568,049, but again, the wear pins are held in a shoe holder, not in the brass support or shoe body itself. Theoretically, the wear pins would be adjusted so that the wear resistant tips contact the pipe and maintain the bottom surface of the shoe slightly spaced from the surface of the pipe, thereby eliminating any wear on the shoe itself. As the tips wear away, the wear pins are inserted further into their holders to maintain the spacing. The technique of the '049 patent is still used today for "longitudinal" sensor shoes, in other words, shoes extending longitudinally along the pipe. It has evolved to use threaded tungsten buttons about ⅜ inch (about 9.5 mm) diameter.

As opposed to transverse sensor shoes, which do not rotate and are typically stationary during inspection (there will be relative axial movement between the tubular and the sensor shoes), inspecting the surface of the tubular members using the longitudinal shoes of the '349 and '049 patents requires that the inspection sensor be moved along the surface in a predetermined inspection path. In one widely used longitudinal pipe inspection apparatus, a plurality of longitudinal sensor shoes are applied to the surface of the pipe in circumferential spacing thereabout and each of the sensor shoes are moved relatively to the pipe in a circumferential helical path whereby the plurality of sensors provides more than 100 percent coverage of the pipe surface. The relative movement may be affected by moving the sensors longitudinally while rotating the sensor shoes around a stationary pipe or the pipe can be moved longitudinally while the sensors are rotated about the pipe. In any event, there is relative sliding movement between the longitudinal sensor shoes and the pipe surface, which causes wear of the contact surfaces of a sensor shoe by extensive use. The shim also can come into contact with the pipe and can be similarly eroded. The wearing down of the contact surfaces and shim results in the coils being supported from the pipe surface inside the optimum spacing range or possibly being damaged by eventual contact with the pipe. When either event occurs, either a new sensor shoe is required, or adjustments as explained in the '394 and '049 patents must be made. Similarly, when using transverse sensor shoes, the relative axial movement of the tubular through the sensing apparatus causes wear of the tungsten coating used to protect the shoes.

The sensor shoes of the '394 and '049 patents may be classified as longitudinal sensor shoes that are adjustable with respect to the size (diameter) of tubular being inspected. The '394 patent addresses this problem using a pair of adjustable, wear-resistant elongate contact members having triangular cross-section, whereby adjustment screws in slots are employed for adjustment of each. The '049 patent has other adjustment mechanisms designed to allow longitudinal sensor shoes to be adjusted to inspect more than one diameter of pipe. However, the adjustment of these contact members as described in the '394 and '049 patents may be physically challenging, and the adjustments (alignment) must be identical for both sides of the shoe.

Transverse sensor shoes may be classified as being designed for use with a specific diameter of pipe or tubular, and the contact surfaces of the sensor shoe are fixed in a permanent orientation about the tubular such that when placed in contact with the surface of the pipe, the sensing coil is positioned for optimum detection sensitivity. Accordingly, transverse sensor shoes are designed for inspection of only one diameter of pipe and are inappropriate for use as an inspection sensor for pipes of a different diameter since for such pipe diameters the sensing coil is supported at other than an optimum distance from the surface to be inspected. The sensor shoes described in accordance with the present disclosure are of this type. A problem exists, however, in the sensor shoes described above where one or more sensor coils are mounted in a recess in a brass support using a potting material such as epoxy, and the brass support is coated with a thin tungsten carbide, or other magnetically transparent coating. If the supplier of the tungsten carbide or other coating has disruptions in their processing, or raises price exorbitantly for their service, or simply stops producing the coatings, the supply of ready to use transverse sensor shoes becomes limited.

One goal of OCTG producers is high tonnage production per day or other time period, and any process or sub-process that slows down the manufacturing of OCTG or other tubulars is disadvantageous economically. In short, the more tons of pipe out the door the better. From the above it is evident that there is a need in the art for improvements in tubular member inspection methods and apparatus, particularly improvements in transverse sensor shoes of the type comprising a nonmagnetic support and a nonmagnetic wear-resistant coating. It would be a further advance in the art if, while solving the coating problem, the spacing between the sensor coil inside the shoes and tubular could be adjusted (decreased) so that the sensor provides higher quality signals and thus better flux leakage inspection. This would allow detecting much smaller signals than the brass shoes can allow. The apparatus, systems, and methods of the present disclosure are directed to these needs.

SUMMARY

In accordance with the present disclosure, apparatus and systems for inspecting OCTG and other tubulars are presented, and methods of using same to inspect OCTG and other tubulars are described which reduce or overcome many of the faults of previously known apparatus, systems, and methods.

A first aspect of the disclosure is a transverse EMI shoe comprising:
 (a) a generally arcuate body (2) having a non-working major face (16), a working major face (17), a trough (4) configured to hold one or more sensor coils embedded in a potting material (34), and at least one through hole (14) (in certain embodiments, a single central through hole) for mechanical connection of the generally arcuate body (2) to an EMI apparatus;

(b) the generally arcuate body (2) including at least one non-central through hole (6, 8, 42, 46) in which are positioned respective adjustable externally threaded cylindrically-shaped set screws (10, 12, 40, 44), each of the at least one non-central through holes (6, 8, 42, 46) having a wear-resistant friction member (18, 20, 30, 32) movably secured therein and positioned such that a distal portion of each wear-resistant friction member (18, 20, 30, 32) protrudes away from the major working face (17) an initial distance (d1) and configured to wear down over time to a generally arcuate surface (21) that is a distance d2 from the major working face (17), where d2<d1, forming worn friction members (18A, 20A, 30A, 32A), the adjustable externally threaded cylindrically-shaped set screws (10, 12, 40, 44) configured to be advanced further into the generally arcuate body (2) and thus advance the generally arcuate surface (21) to a distance d3, where d1≥d3>d2.

In certain embodiments the generally arcuate body (2) may be selected from plastic materials and non-magnetic metal materials. In certain embodiments the generally arcuate body (2) may comprise an internally homogeneously lubricated, high-strength polyamide polymer. In certain embodiments the plastic material may consist essentially of an internally homogeneously lubricated, high-strength polyamide polymer. In certain embodiments the plastic material may consist of an internally homogeneously lubricated, high-strength polyamide polymer. In certain embodiments the plastic material may comprise a filler promoting higher crystallinity in the internally homogeneously lubricated, high-strength polyamide polymer. In certain embodiments the filler may be molybdenum disulfide present at a weight percentage ranging from about 0.1 to about 3 weight percent. In certain embodiments the internally homogeneously lubricated, high-strength polyamide polymer comprises from about 2 to about 8 percent by weight of one or more internal lubricants. In certain embodiments the internal lubricant may be zinc, diheptoxy-sulfanylidene-sulfido-λ5-phosphane.

In certain embodiments the internally homogeneously lubricated, high-strength polyamide polymer may have a flexural strength ranging from about 10,000 to about 20,000 psi, or from about 14,000 to about 16,000 psi in accordance with ASTM D790. In certain embodiments the internally homogeneously lubricated, high-strength polyamide polymer may have a flexural strength ranging from about 15,500 to about 16,000 psi in accordance with ASTM-D790. In certain embodiments the internally homogeneously lubricated, high-strength polyamide polymer may have a flexural modulus ranging from about 300,000 to about 500,000 psi, or from about 375,000 to about 475,000 psi, or from about 425,000 to about 475,000 psi in accordance with ASTM-D790.

In certain embodiments the externally threaded cylindrically-shaped set screws may be independently selected from the group consisting of slotted set screws, socket set screws, square drive set screws, and hex drive threaded set screws. In certain embodiments the externally threaded cylindrically-shaped set screws may be steel having a tensile strength ranging from about 50,000 to about 150.00 psi, or from about 75,000 psi to about 100,000 psi in accordance with ASTM E8/E8M and/or A370. In certain embodiments the externally threaded cylindrically-shaped set screws may be self-locking and at least a portion of the external threads may have an adhesive thereon that activates immediately after installation, locking the self-locking thread set screws into place and sealing against liquids and gases. In certain embodiments the externally threaded cylindrically-shaped set screws may be self-locking and at least a portion of the external threads may have a polyamide coating thereon that melts during installation and hardens thereafter, locking the self-locking thread set screws into place and sealing against liquids and gases.

In certain embodiments each of the wear-resistant friction members may have a Vickers microhardness of at least about 500, or at least about 700, or at least about 800, or at least about 1000 (ASTM E384-89), a modulus of elasticity of at least about 130, or at least about 150, or at least about 170 MPa (at least about 18,900, or at least about 21,800, or at least about 24,700 psi) (ASTM C674-88), a flexural strength of at least about 250, or at least about 275, or at least about 300 MPa (at least about 36,250, or at least about 39,900, or at least about 43,500 psi) (ASTM C674-88), a compressive strength of at least about 1000, or at least about 1200, or at least about 1350 MPa (at least about 144,000, or at least about 173,000, or at least about 195,000 psi) (ASTM C773-88), and a fracture toughness of at least about 2, or at least about 2.5, or at least about 3 MPa-m$^{1/2}$ (at least about 1.8, or at least about 2.3, or at least about 2.7 ksi-in$^{1/2}$) (Vickers indentation). In certain embodiments the wear-resistant friction members may be independently selected from ceramic and metallic materials. Suitable ceramic materials include aluminum oxide, zirconia oxide, silicon carbide, silicon nitride, and the like. Suitable metallic materials include hardened steels and tool steels, for example steels having hardness of at least about 40, or at least about 50, or at least about 60 HRC (Rockwell hardness, C scale). Such steels include A-2 steel (HRC of 63 max), D-2 steel (HRC 63 max), M-2 (max HRC of 65), and the like.

In certain embodiments each of the wear-resistant friction members is secured in the one or more non-central through holes by friction fitting.

In certain embodiments each of the wear-resistant friction members may have a shape independently selected from the group consisting of spherical, oval, cylindrical pin, and cylindrical button.

A second aspect of the disclosure are methods of EMI of tubulars, comprising:
(a) providing at least one EMI shoe of the first aspect in an EMI apparatus, where a distal portion of each wear-resistant friction member (18, 20, 30, 32) protrudes away from the major working face (17) an initial distance (d1);
(b) magnetizing (in certain embodiments, longitudinally magnetizing) the tubular member during step (a);
(c) detecting magnetic flux leakage from the tubular member using the at least one EMI shoe during steps (b) and (c), wherein each wear-resistant friction member (18, 20, 30, 32) contacts an external surface of the tubular member, for a time period wherein d1 changes to d2 and forming worn friction members (18A, 20A, 30A, 32A) each having an arcuate surface (21), where d2<d1; and
d) adjusting the externally threaded cylindrically-shaped set screws (10, 12, 40, 44) such that arcuate surface (21) of each of the worn friction members (18A, 20A, 30A, 32A) are moved and positioned such that the arcuate surface (21) of each worn friction member (18A, 20A, 30A, 32A) protrudes away from the major working face (17) a distance (d3) such that d1≥d3>d2.

In certain method embodiments the magnetic flux leakage is detected by the one or more sensors spaced so that their respective magnetic fields abut and provide a minimum of 100 percent inspection of the tubular member.

A third aspect of the disclosure is a tubular member EMI apparatus comprising:
(a) at least one magnetic flux generator (104) contained in a coil annulus (108) and a detector assembly (106) supported by the coil annulus (108);
(b) the coil annulus (108) and the detector assembly (106) each having inlet and outlet openings (110, 112) for passing a tubular member (2) there through, the detector assembly (106) having one or more magnetic flux leakage detectors (116) (magnetic, eddy current, or both) configured to be spaced a first distance from the tubular member (2) during an inspection; and
(c) the one or more magnetic flux leakage detectors (116) each contained in one or more EMI detector shoes (30), the one or more EMI detector shoes (30) comprising:
(i) a generally arcuate body (2) having a non-working major face (16), a working major face (17), a trough (4) configured to hold one or more sensor coils embedded in a potting material (34), and at least one through hole (14) for mechanical connection of the EMI detector shoes (30) to the EMI apparatus;
(ii) the generally arcuate body (2) including at least one non-central through hole (6, 8, 42, 46) in which are positioned respective externally threaded cylindrically-shaped set screws (10, 12, 40, 44), each of the at least one non-central through holes (6, 8, 42, 46) having a wear-resistant friction member (18, 20, 30, 32) movably secured therein and positioned such that a distal portion of each wear-resistant friction member (18, 20, 30, 32) protrudes away from the major working face (17) an initial distance (d1) and configured to wear down over time to a generally arcuate surface that is a distance d2 from the major working face (17), where d2<d1, forming worn friction members (18A, 20A, 30A, 32A), the adjustable externally threaded cylindrically-shaped set screws (10, 12, 40, 44) configured to be advanced further into the generally arcuate body (2) and thus advance the generally arcuate surface (21) to a distance d3, where d1≥d3>d2.

Certain embodiments may comprise one or more pinch roller systems (130), the coil annulus (108) may comprise rigid aluminum, and the apparatus may be configured to perform a quality EMI of OCTG pipe any wall thickness, and with production speeds up to about 150 feet per minute (about 46 meters per minute) or greater. In certain embodiments the EMI apparatus may be configured to operate continuously. In certain embodiments the EMI apparatus may be configured to inspect plain-end OCTG materials having an outer diameter ranging from about 2⅜ inches (about 60.3 mm) to about 8.00 inches (about 203.2 mm) or ranging from about 4½ inches (114.3 mm) to about 14.00 inches (355.6 mm). In certain embodiments the EMI apparatus may be configured to perform EMI methods including magnetic flux leakage technology for OD and ID longitudinal and transverse flaws, magnetic flux density for 100% coverage of the wall thickness variations, and an eddy current system for comparison of metallurgical mass and permeability differences.

In certain embodiments the tubular member, OCTG or other tubular, may be hollow; in other embodiments the tubular member may be solid.

In certain embodiments the EMI shoes may be configured to provide a set off distance for the magnetic detectors of at most 0.030 inch (at most about 0.08 mm); in certain other embodiments the set off distance may range from about 0.005 inch (about 0.02 mm) up to about 0.020 inch (about 0.08 mm). In certain embodiments the detector assembly may comprises a plurality of detector support sub-assemblies. Certain embodiments may comprise one or more actuators selected from the group consisting of pneumatic, hydraulic, and electronic actuators, and combination thereof, for example, to actuate the one or more pressure actuators, and in certain embodiments, telescoping members, to actuate an iris, and the like.

In certain embodiments various components (for example, but not limited to the magnetic flux generator, detectors, telescoping supports, and/or iris (as disclosed in assignee's U.S. patent application Ser. No. 16/987,211, filed Aug. 6, 2020) may be operated remotely via wired or wireless communication, and/or locally via on-board batteries, an on-board motor, and one or more programmable logic controllers (PLCs). Certain embodiments may comprise a software module including one or more algorithms for calculating or presenting parameters selected from the group consisting of longest substantially longitudinal flaw, deepest substantially longitudinal flaw, longest substantially transverse flaw, deepest substantially transverse flaw, minimum and maximum wall thickness, and combinations thereof. In certain embodiments the detector assembly may comprise one or more EMAT sensors.

Certain embodiments may further comprise a tubular conveyor sub-system on which the tubulars traverse before and after being inspected. Certain embodiments may further comprise one or more actuators (in certain embodiments, one or more robots) adapted to pick up the tubular being inspected and insert the tubular into an EMI apparatus as disclosed in accordance with the present disclosure, the one or more actuators selected from the group consisting of pneumatic, hydraulic, and electronic actuators, and combination thereof.

These and other features of the apparatus, systems, and methods of the disclosure will become more apparent upon review of the brief description of the drawings, the detailed description, and the claims that follow. It should be understood that wherever the term "comprising" is used herein, other embodiments where the term "comprising" is substituted with "consisting essentially of" are explicitly disclosed herein. It should be further understood that wherever the term "comprising" is used herein, other embodiments where the term "comprising" is substituted with "consisting of" are explicitly disclosed herein. Moreover, the use of negative limitations is specifically contemplated; for example, certain apparatus, systems, and methods in accordance with the present disclosure may comprise a number of physical or chemical components and features but may be devoid of certain optional physical, chemical or other components and features.

BRIEF DESCRIPTION OF THE DRAWINGS

The manner in which the objectives of this disclosure and other desirable characteristics can be obtained is explained in the following description and attached drawings in which:

FIGS. 7 and 9 are schematic cross-sectional views of the EMI shoe of FIGS. 4-6;

It is to be noted, however, that the appended drawings of FIGS. 1-11 may not be to scale and illustrate only typical apparatus and system embodiments of this disclosure. Furthermore, FIG. 12 illustrates only one of many possible methods of this disclosure. Therefore, the drawing figures are not to be considered limiting in scope, for the disclosure may admit to other equally effective embodiments. Identical reference numerals are used throughout the several views for like or similar elements.

DETAILED DESCRIPTION

Figure 1:
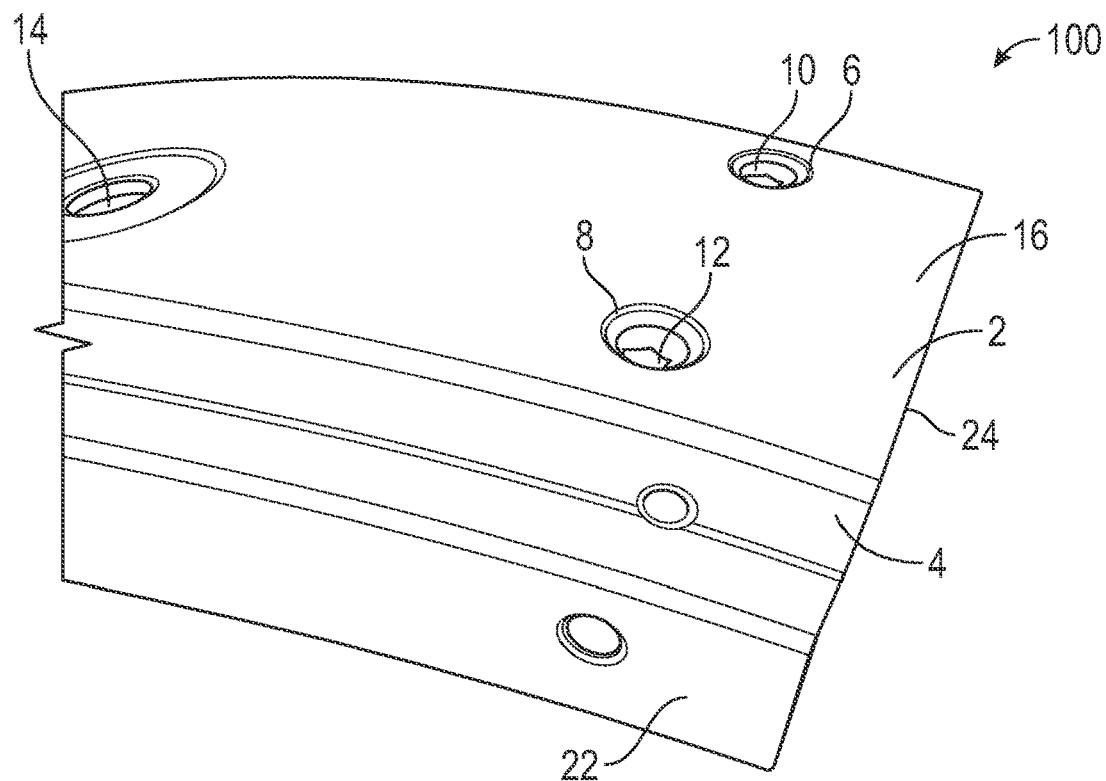
FIG. 1 is a schematic perspective view of a portion of an EMI inspection shoe of the present disclosure before magnetic flux sensors are potted therein.

In the following description, numerous details are set forth to provide an understanding of the disclosed apparatus, systems, and methods. However, it will be understood by those skilled in the art that the apparatus, systems, and methods disclosed herein may be practiced without these details and that numerous variations or modifications from the described embodiments may be possible. All patent applications and patents referenced herein are hereby explicitly incorporated herein by reference, irrespective of the page, paragraph, or section in which they are referenced.

Where a range of values describes a parameter, all sub-ranges, point values and endpoints within that range are explicitly disclosed herein. Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

The present disclosure describes apparatus, systems, and methods for inspection of OCTG or other tubular or pipe. As mentioned herein, OCTG means any tubular used in the oil & gas industry, including solid tubulars such as rod pump rods, including but not limited to, drill pipe, line pipe, casing, coiled tubing, and the like, including those that have been through none, all or a combination of any one or more of the common mechanical, thermal, chemical OCTG treatment methods.

The apparatus may comprise a single or multiple detectors (sometimes referred to herein as "sensors", "detector elements", "instruments", or simply "detectors") using magnetic flux leakage principles, eddy current, electromagnetic acoustic (EMA), or any combinations of these, to inspect OCTG for the presence of flaws. The detector(s) may be mounted on the apparatus through a variety of ways depending on the detector being installed, positions available in the apparatus, and the accuracy of flaw detection required. Software either intrinsic to the detector, or installed elsewhere in the apparatus, or installed remotely on a computer type device, converts the measurements into usable calculated information. The usable calculated information may be displayed locally at the device and/or remotely on a computer type device. Digital signal processing software, known under the trade designation Digi-Pro™, available from Scan Systems Corp, Houston, Tex., allows 100 percent of the inspection signal to be digitized and processed within a computer. The computer and digital signal processing software known under the trade designation Digi-Pro™ may utilize a series of virtual printed circuit boards known under the trade designation SimKardz™ to perform the calculations required. Signals may be captured from the detectors and digitized almost immediately, then processed through one or more algorithms to produce large signal to noise ratios. Improvements in signal to noise ratios of at least 20 percent, sometimes at least 100 percent, and in certain embodiments even 200 percent have been seen, compared with existing industry standard equipment. Hall Element devices may be used to sense the electrical shift in voltage during the inspection methods of this disclosure; however, there could be any number of different sensing technologies that could be used, eddy current being one of the other preferred sensing technologies.

In certain embodiments, the magnetic field fluctuation detectors may be hall units. Other similar devices may be utilized with the method, selected from magneto resistors, magneto diodes, coiled electrically-conductive wires (sometimes referred to as induction coils, wound coil sensors, or simply wound coils), and combinations of hall units, magneto resistors, magneto diodes, and coiled electrically-conductive wires. The sensor elements could be multiple elements spread from one end of the trough to the other end, or only in a portion of the trough, or could just be one wound coil covering the entire trough or a portion thereof. The sensor technology used, number, and position are determined by what type and how small the flaws might be that the end user wants to find. As noted in U.S. Pat. No. 7,038,445, the number of flux lines flowing through the hall detector will be a function of the wall thickness of the material being monitored. Therefore, this monitoring device of the hall units spaced within the inside circumference of a magnetic coil provides the means of measuring the wall thickness of the pipe or OCTG. In certain embodiments, an "or" circuit may be interconnected with each group of magnetic fluctuation detectors so that the largest signal generated from a group of hall units may be determined. In certain embodiments, a defect monitor may be interconnected with each group of the magnetic fluctuation detectors to identify defective hall units.

The term "pipe," as used herein, includes any pipe, hose, tube, pole, shaft, cylinder, duct, rod, oil field tubular, tubing for the flow of oil or gas, casing, drill pipe, oil field tubulars and equivalents thereof made in whole or part of a ferromagnetic material. The term "flaw" as used herein includes any defects, discontinuities or irregularities in the walls or on the surface of the pipe, for example, seams, cracks, chips, and unusual wear.

The terms "magnetic field fluctuation detector" and "magnetic flux detector" used herein, include hall units, magneto diodes, magneto resistors, wound coils, and the like. In certain embodiments the magnetic fluctuation detector utilized with apparatus, systems, and method embodiments described herein is a hall unit. The term "hall unit," as used herein, includes any Hall detector, and any device or detector which produces a voltage in relation to a magnetic field applied to the detector. Although well known, a brief description of the hall detector is provided. A Hall detector is generally manufactured as a four terminal solid state device which produces an output voltage proportional to the product of an input current, a magnetic flux density and the sine of the angle between magnetic flux density and the plane of the hall detector. A Hall detector typically has an active element and two pairs of ohmic contacts. An electric current flows between two contacts aligned in one direction x. This current, the magnitude and direction of which are known from a calibration stage, in the presence of a perpendicular magnetic field, generates a respective Hall voltage in the other two contacts aligned in a transverse direction y. As known, a Hall detector is sensitive to that component of the magnetic field which is perpendicular to its surface. More specifically, the Hall voltage is responsive to the current flow and to the strength of a magnetic field provided within the vicinity of the Hall detector.

The term "magnetic field generator" as used herein includes any permanent magnet or set of permanent magnets, as well as any device capable of generating a horizontal, vertical, or other directional magnetic field of flux by passing an electrical current therethrough (and in the latter cases the terms "electromagnet" and "magnetic coil" may be used). In certain embodiments the magnetic field generator is an electrically conductive metal wire coil such as an encircling coil or circular coil with multiple turns located in the cavities of a coil annulus. The term "coil annulus" means a structure holding, supporting, and/or encompassing a magnetic field generator or magnetic coil.

Eddy current inspection, as explained in U.S. Pat. No. 5,142,230, is a non-destructive procedure used to detect flaws and stress corrosion in electrically conductive materials. This method involves placing an eddy current probe, comprising a coil, near the electrically conductive material. The coil sets up a magnetic field and induces eddy currents in the material. Defects in the material alter the eddy current flow and change the impedance of the coil. As a result, flaws and stress corrosion may be detected by moving the eddy current probe along the material and detecting changes of impedance of the coil.

In certain embodiments, the inspection shoe supports may be actuated by a dual linkage actuator disclosed in U.S. Pat. Nos. 7,397,238 and 7,622,917, and selected from pneumatic, hydraulic, and electronic actuators. In certain embodiments, telescoping supports and iris rotatable elements such as disclosed in assignee's U.S. patent application Ser. No. 16/987,211, filed Aug. 6, 2020 may be actuated by an actuator selected from pneumatic, hydraulic, and electronic actuators. In certain embodiments the detector assemblies may each support a transverse magnetic detector and a wall thickness detector. The detectors may be selected from Hall elements, magneto diodes, magneto resistors, wound coils, and the like. In certain embodiments, the variations in the magnetic field detected by magnetic flux detectors and the variations in eddy current detected by eddy current detectors are provided by spacing the detectors so that their respective magnetic or electric fields abut and provide a minimum of 100 percent inspection of the tubular member.

The primary features of the EMI shoes, systems, and methods of the present disclosure will now be described with reference to the drawing figures, after which some of the construction and operational details, some of which are optional, will be further explained. The same reference numerals are used throughout to denote the same items in the figures.

Figure 2:
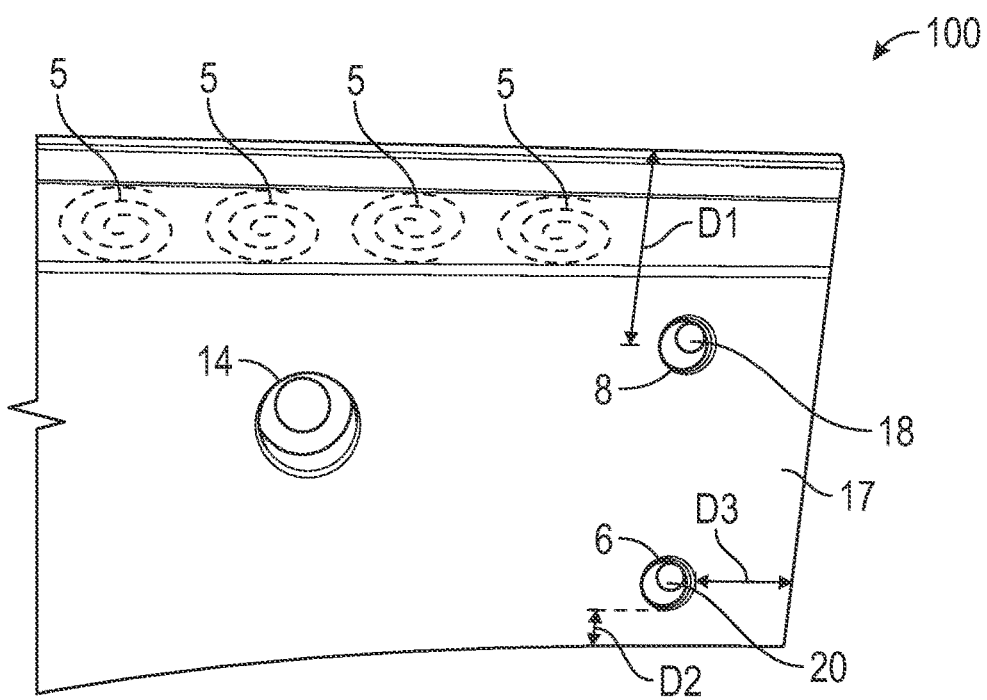
FIG. 2 is a schematic plan view of a portion of the EMI shoe of FIG. 1, illustrating in phantom one possible position of wound coil sensors.
Figure 3:
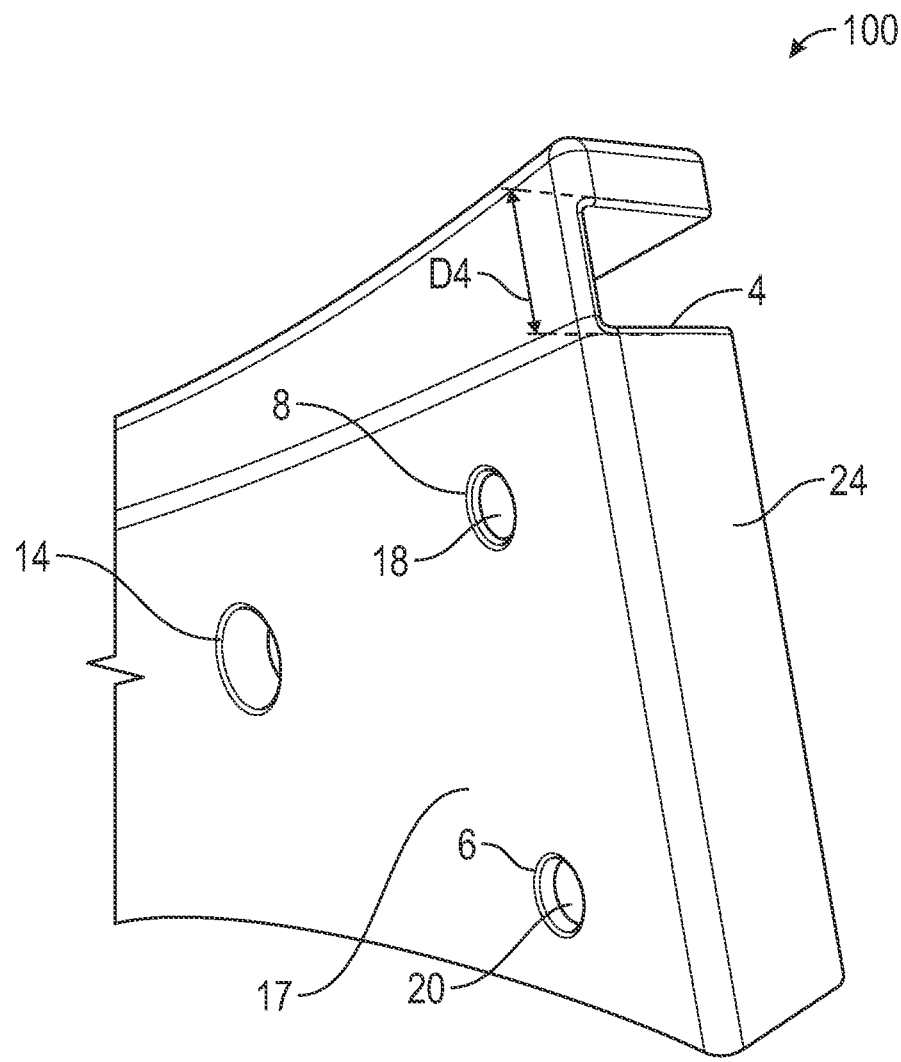
FIG. 3 is another schematic perspective view of the EMI shoe embodiment illustrated schematically in FIGS. 1 and 2.

FIG. 1 is a schematic perspective view of a portion of an EMI shoe embodiment 100 of the present disclosure before magnetic flux sensors are potted therein. FIG. 2 is a schematic bottom plan view of a portion of the EMI shoe 100 of FIG. 1 showing wound coils in phantom, and FIG. 3 is another schematic perspective view of the EMI shoe embodiment 100 illustrated schematically in FIGS. 1 and 2, with the bottom (working) surface viewable. EMI shoe embodiment 100 features a rigid, arcuate plastic body 2 including a trough 4 for one or more sensor or detector coils 5. "Arcuate" in these embodiments means body 2 has a curvature or arc substantially the same as the curvature or arc of the tubular to be inspected. Coils 5 are also illustrated in phantom in embodiment 200, FIG. 4, and in embodiments 300, 400, and 500 illustrated schematically in FIGS. 4A, B, and 4C. EMI shoe embodiment 100 includes a first, second, third, and fourth through holes (6, 8, 42, and 46) in body 2. Respective first, second, third, and fourth set screws (10, 12, 40, 44) are secured, preferably by friction fitting, in through holes (6, 8, 42, and 46) in body 2, although other securing methods may be employed, such as adhesives. EMI shoe embodiment 100 includes a central through hole 14 for mechanical connection of the shoe to an EMI apparatus.

Still referring to FIGS. 1-3, embodiment 100 includes a non-working surface 16 and a working surface 17 of plastic body 2, where working surface 17 is closest to the tubular member being inspected. First and second ceramic balls 20, 18 are friction-fitted in respective through holes 6, 8. Embodiment 100 further includes a long edge 22 of plastic body 2, configured to be transverse to the tubular member when in use, and a short edge 24 of plastic body 2, configured to be parallel to the tubular member when in use. Since the long edge 22 is transverse to the tubular member when in use, the EMI shoes of the present disclosure are referred to herein as transverse EMI shoes, transverse inspection shoes, or simply transverse shoes.

Figure 4:
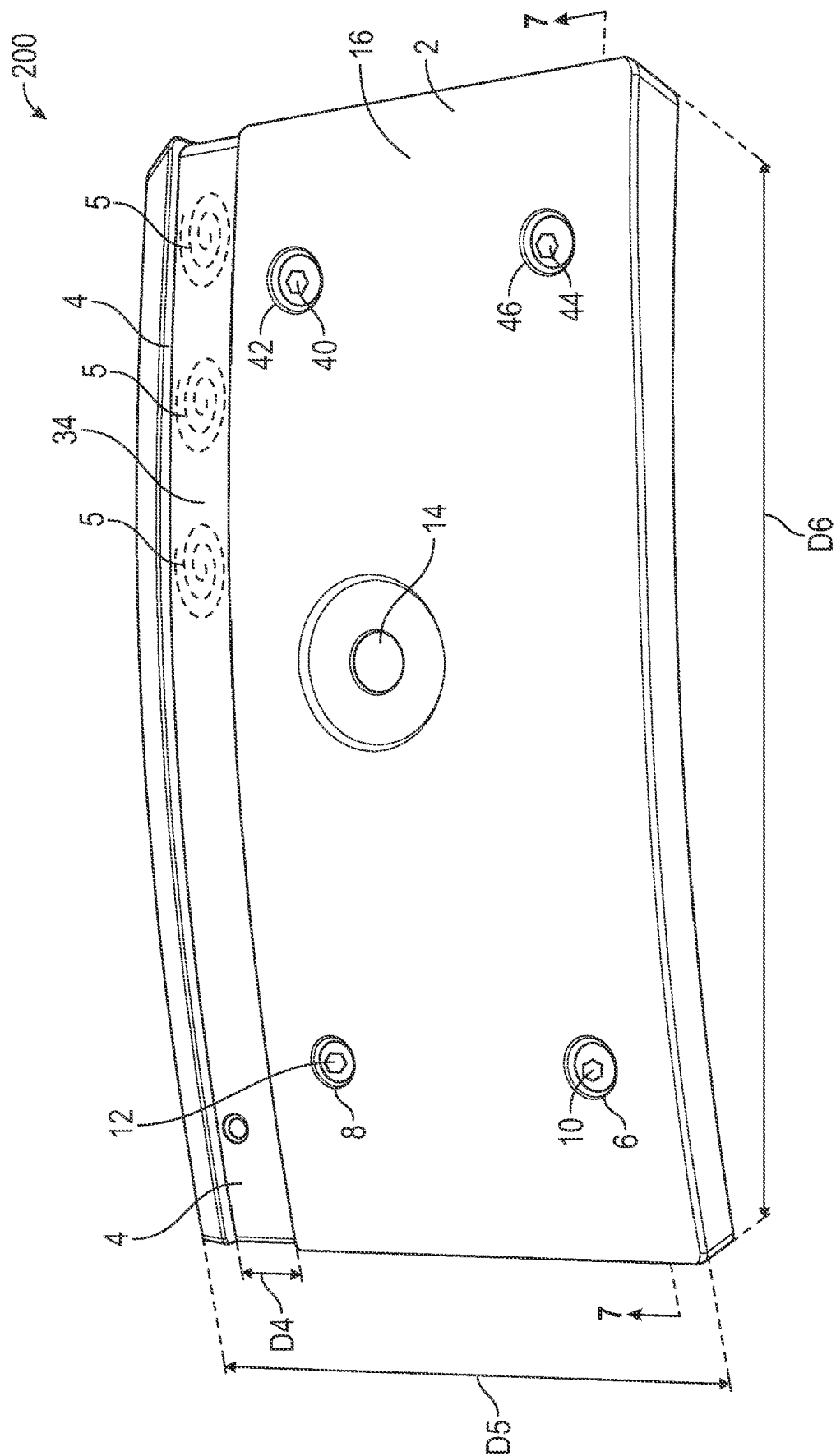
FIG. 4 is a schematic perspective view of the EMI shoe illustrated schematically in FIGS. 1-3 further including the wound coil sensors and epoxy potting, as well as wire connectors, showing the top (non-working) side of the shoe.

FIG. 4 is a schematic perspective view of an EMI shoe embodiment 200, which is embodiment 100 illustrated schematically in FIGS. 1-3 further including the magnetic flux coils 5 and epoxy potting 34, as well as wire connectors 36, 38, showing the top (non-working) surface 16 of the shoe. It will be understood that certain EMI shoe embodiments in accordance with the present disclosure will have less or more than three inspection coils 5, for example, certain embodiments may have only one coil 5, while other embodiments may have as many as 20 coils 5, depending on the inspection project. It will also be understood that trough 4 may include one or more coils 5 extending the entire length of trough 4, or only a portion of trough 4. Epoxy potting 34 is used to maintain the sensors in position, and to substantially waterproof them. It will be understood that potting materials other than epoxy may be used to maintain them in position and for waterproofing, such as silicone, acrylic, polyamide, polyimide, and polycarbonate materials, and the like, and mixtures and combinations thereof.

FIGS. 2-4, 8 and 10 illustrate some typical dimensions of certain embodiments of transverse EMI shoes of the present disclosure. Table 1 summarizes nonlimiting narrow and broad ranges for these dimensions for these embodiments.

TABLE 1

Typical Dimensions for Shoe Embodiments 100 and 200

Figure 8B:
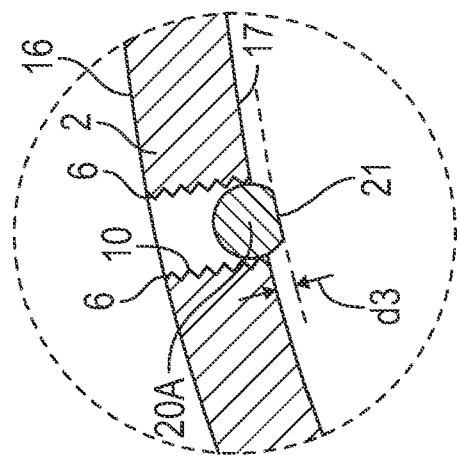
FIGS. 8, 8A, and 8B are close up cross-sectional views of the schematic cross-sectional view of FIG. 7, and FIGS. 10, 10A, and 10B are close up cross-sectional views of the schematic cross-sectional view of FIG. 9.
Figure 8A:
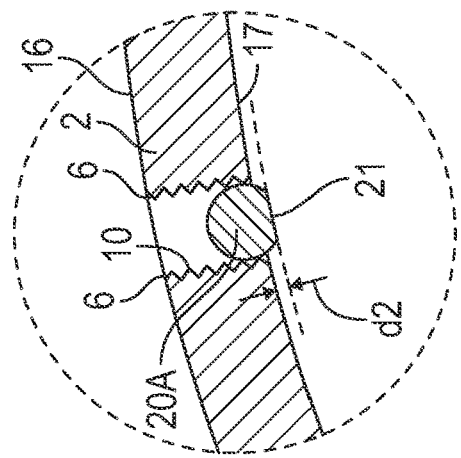
Figure 8:
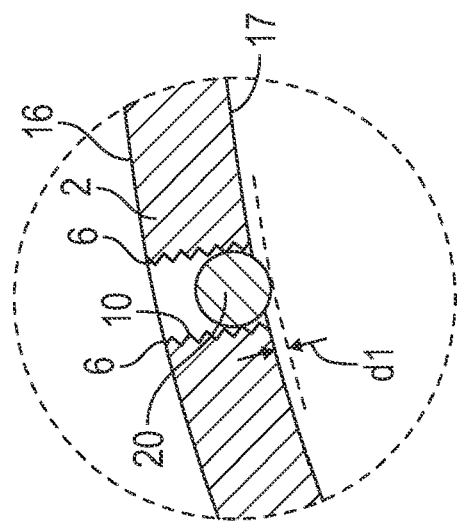

| Feature and FIG. | Broad range (in.) | Less broad range (in.) |
|---|---|---|
| D1, FIG. 2 | 0.125-1.0 | 0.25-0.5 |
| D2, FIG. 2 | 0.125-0.5 | 0.25-0.5 |
| D3, FIG. 2 | 0.125-0.5 | 0.25-0.5 |
| D4, FIG. 4 | (0.20 × D5)-(0.35 × D5) | (0.20 × D5)-(0.25 × D5) |
| D5, FIG. 4 | 2-8 | 3-5 |
| D6, FIG. 4 | 4-16 | 6-10 |
| d1, FIGS. 8 and 10 | 0.003-0.020 | 0.010-0.030 |
| d2, FIGS. 8A and 10A | <d1 | <d1 |
| d3, FIGS. 8B and 10B | d1 ≥ d3 > d2 | d1 ≥ d3 > d2 |
| d4, FIG. 10 | ≤0.030 | ≤0.010 |

Figure 4A:
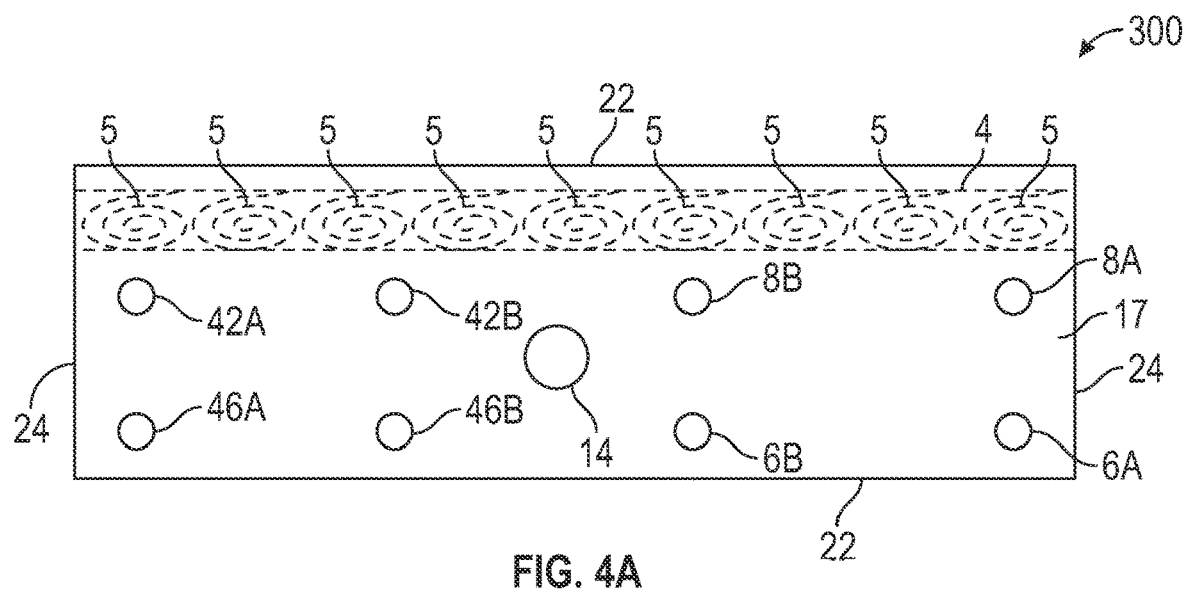
FIGS. 4A, 4B, and 4C are schematic backside plan view illustrations of three other shoe body embodiments, with wound coil sensors and troughs in phantom and with set screws and wear members removed.
Figure 4B:
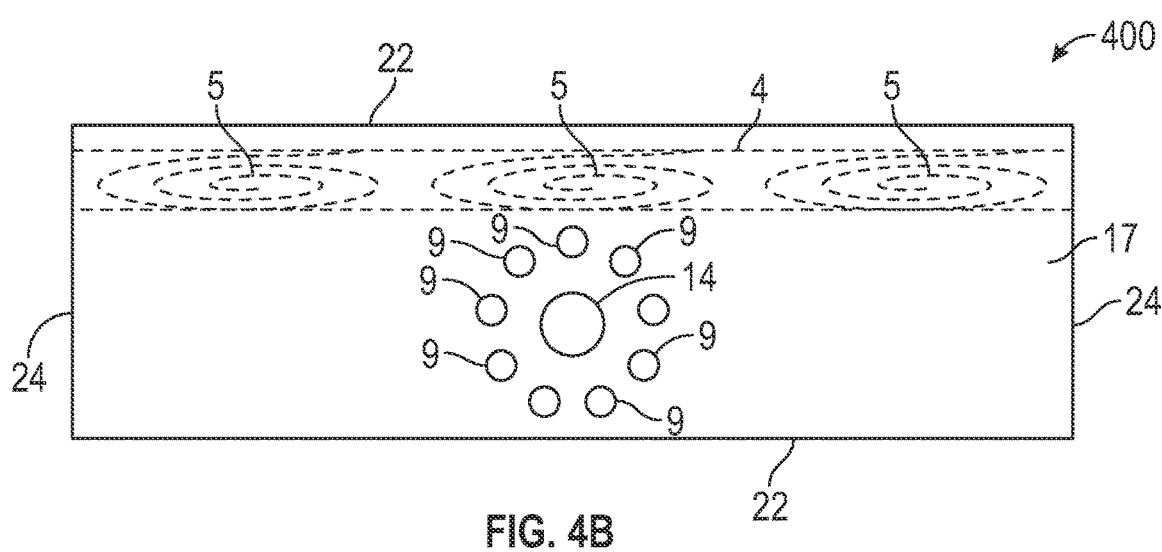
Figure 4C:
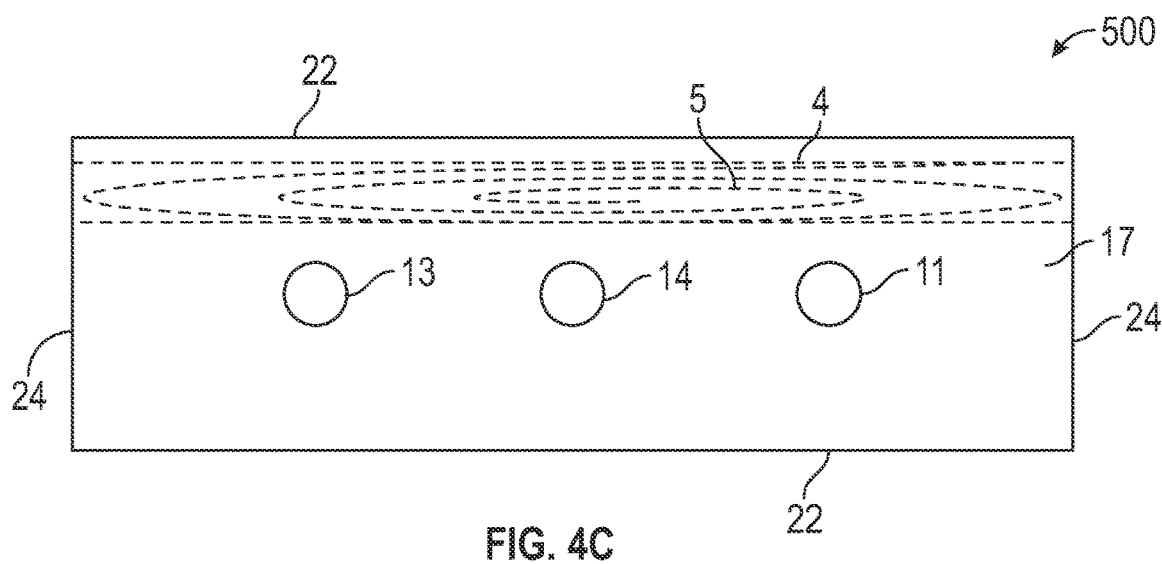

FIGS. 4A, 4B, and 4C are schematic backside plan view illustrations of three other transverse EMI shoe body embodiments 300, 400, and 500, respectively, with wound coil(s) 5 and trough 4 in phantom and with set screws and wear members not illustrated. Embodiments 300, 400, and 500 are intended to illustrate the many different and non-limiting possible arrangements, sizes, and positions of through holes/set screws/wear members that are considered within the present disclosure. Variations other than those specifically illustrated are numerous and those embodiments are also considered within the present disclosure. Embodiment 300 includes nine small wound coils 5, and eight non-central through holes (6A, 6B, 8A, 8B, 42A, 42B, 46A, and 46B) arranged with through holes 6A, 8A, 42A, and 46A positioned distal from central through hole 14 and close to short edges 24, and with through holes 6B, 8B, 42B, and 46B positioned proximal to central through hole 14. Embodiment 400 includes three larger wound coils 5 and seven non-central through holes 9 arranged about central through hole 14. Embodiment 500 includes one large wound coil 5 and two larger through holes 11, 13 positioned about central through hole 14 such that central through hole 14 and non-central through holes 11, 13 form a line substantially parallel to long edges 22 of body 2.

Figure 5:
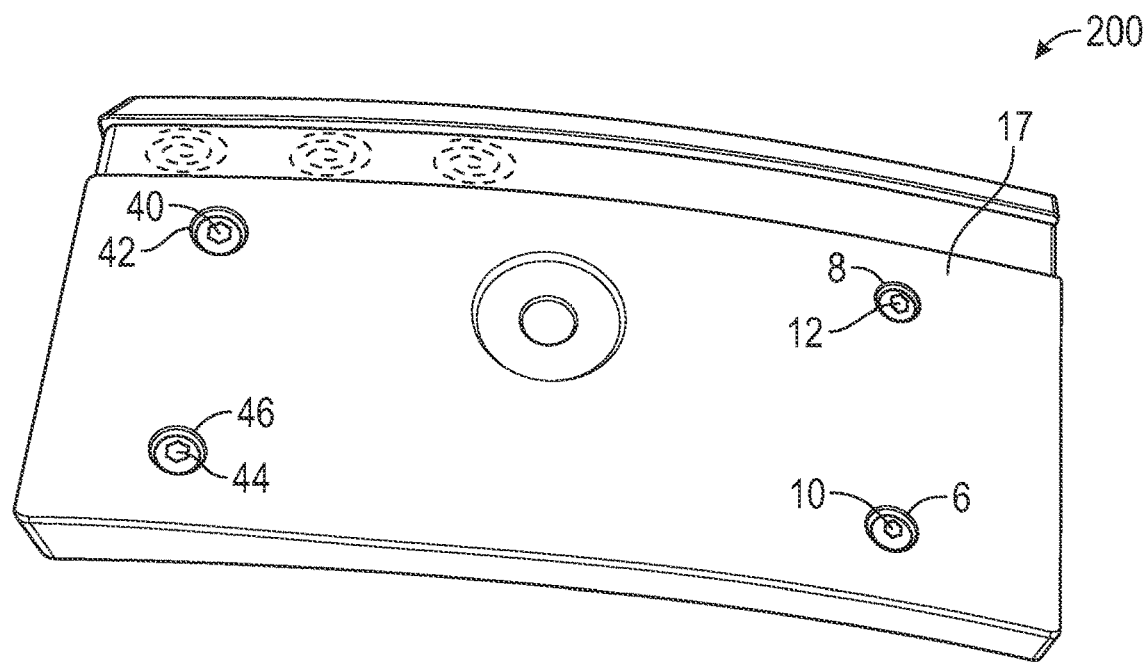
FIG. 5 is a schematic perspective illustration view of the EMI shoe illustrated schematically in FIG. 4, showing the bottom (working) side of the shoe.
Figure 6:
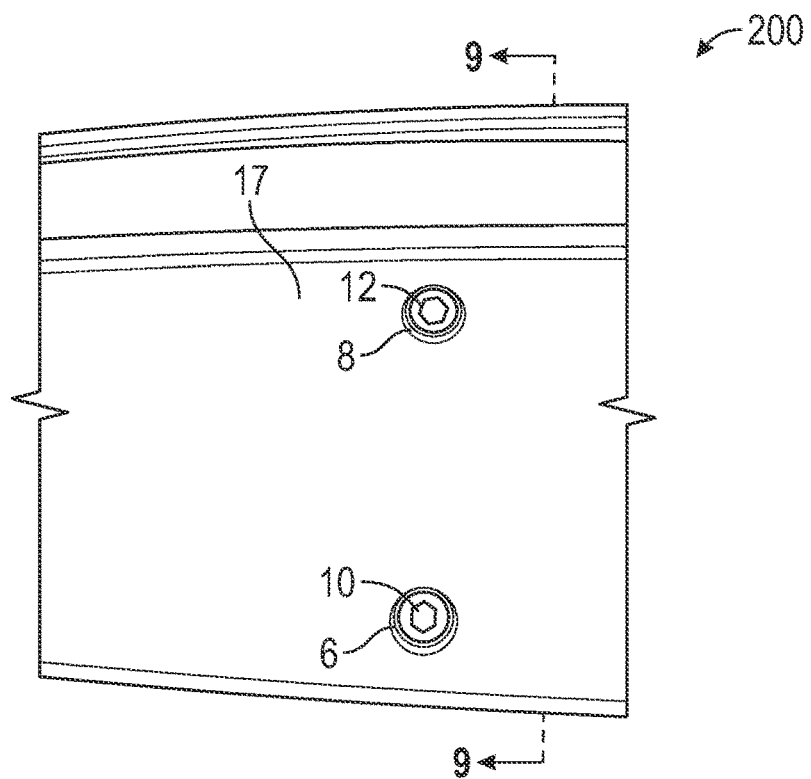
FIG. 6 is a close up view of the bottom (working) side of the EMI shoe illustrated schematically in FIG. 5.

FIG. 5 is a schematic perspective illustration view of the EMI shoe embodiment 200 illustrated schematically in FIG. 4, showing the bottom (working) side of the shoe, while FIG. 6 is a close up view of the bottom (working) side of the EMI shoe embodiment 200. Set screws 10 and 12 are hex driven in embodiment 200.

Figure 7:
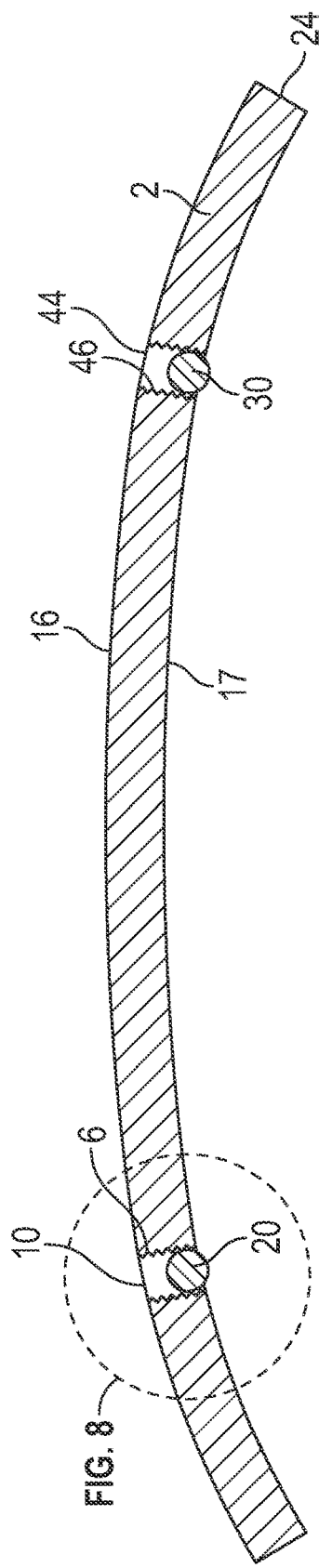

FIGS. 7 and 9 are schematic cross-sectional views of the EMI shoe embodiment 200 of FIGS. 4-6, while FIGS. 8, 8A, and 8B are close up cross-sectional views of the schematic cross-sectional view of FIG. 7, and FIGS. 10, 10A, and 10B are close up cross-sectional views of the schematic cross-sectional view of FIG. 9. These figures illustrate spherical balls 20 and 18 each having distal ends protruding an initial distance d1 from working surface 17 of EMI shoe embodiment 200. FIGS. 8A and 10A illustrate schematically "worn" spherical balls 20A, 18A after a time period of use in contacting tubular members during inspection of same (worn balls 30A and 32A are not shown in these views but would be similarly worn). An arcuate surface is formed on the distal ends of each worn spherical balls 18A, 20A, 30A, and 32A, having approximately the same curvature as the tubular member external surface. These arcuate surfaces are at a distance d2 from working surface 17, where d2<d1. An operator then screws set screws 10, 12, 40, 44) further into body 2 of the EMI shoe, causing the worn spherical balls 18A, 20A, 30A, and 32A to move further out of their respective through holes 6, 8, 42, 46 such that the distal ends of the balls are again at or near distance d1 away from working surface 17 of the EMI shoe, as illustrated in FIGS. 8B and 10B. Eventually, the spherical balls or other shaped wear-resistant members must be replaced, but in this way the EMI shoe body 2 is preserved for longer time periods without having to replace the entire EMI shoe. Further, the detector coils 5 may be beneficially moved closer to the tubular member during inspection, affording greater detection efficiency for small or hard to locate flaws. By employing these EMI shoes, in one case an increase to 50,000 joints of pipe inspected from 10,000 joints was observed before the EMI shoes had to be replaced.

Figure 11:
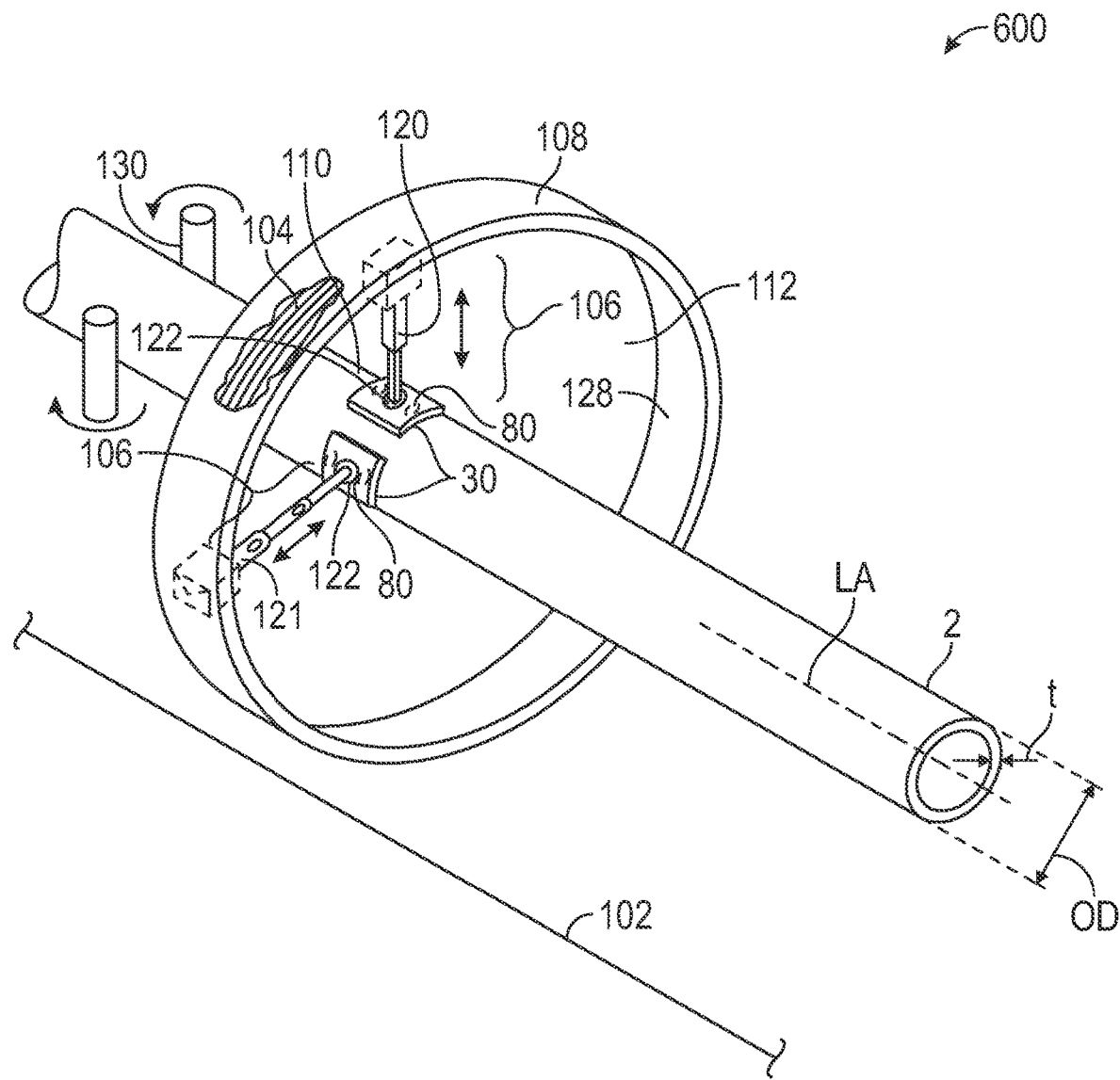
FIG. 11 is a schematic perspective view of one apparatus embodiment in accordance with the present disclosure.

FIG. 11 is a schematic perspective illustration view, with some portions cut away, of an EMI system embodiment 600 in accordance with the present disclosure. Embodiment may comprise a frame 102, a magnetic flux generator (coil) 104 in a coil annulus 108, and a detector assembly 106 supported by frame 102. Coil annulus 108 and detector assembly 106 each have an inlet opening 110 and an outlet opening 112 for accepting a tubular member 2 therein for EMI thereof. Detector assembly 106 includes one or more magnetic flux or eddy current detectors 80 encapsulated in EMI detector shoes 30, the lower surface thereof adapted to be spaced a first distance (d1) from the outer surface of tubular member 2, as explained herein.

Still referring to FIG. 11, embodiment 600 further comprises detector shoe supports 120, 121, which in this particular embodiment are telescoping supports, each of which is attached to an inner surface 128 of coil annulus 108 such as by welding, brazing, bolting, or other attachment method or mechanism, or formed integrally with coil annulus 108. Detector shoe support 120 has a rectangular cross-section, while detector shoe support 121 has a circular cross-section. The cross-sectional shape may be the same or different for each detector shoe support, and they may have other cross-sectional shapes, such as triangular, oval, and the like. Adjustable telescoping tubes typically include spring button locking pins or single end snap buttons, and may be easily found on the Internet, such as at the website of W.W. Grainger, Inc. Other versions of telescoping supports may lock and unlock by a simple twist action. As indicated by the double-headed arrows in FIG. 11 proximate to telescoping detector shoe supports 120, 121, telescoping detector shoe supports 120, 121 allow detector shoes 30 to be moved inward and outward as desired, conveniently allowing EMI of different OD tubulars 2. In certain embodiments, tubular wall thickness (t) may also be investigated. A further feature of embodiment 600 is provision of quick-acting (Q-A) couplings 122, explained more fully in assignee's co-pending U.S. patent application Ser. No. 16/987,211, filed Aug. 6, 2020, that allow detector shoes 30 to be removably installed and removed quickly. For example, one or more detector shoes 30 for a 4-inch OD pipe may be used to inspect one or more of such tubulars, then the process stopped momentarily, for example by stopping a set of pinch rollers 130. While the process is stopped, the first set of detector shoes are removed, and another set of detector shoes are installed to inspect larger or smaller tubulars.

In embodiment 600, as in other embodiments described herein, magnetic flux generator 104 is typically a coil of wire, but this is not strictly necessary, as any magnetic flux generator may be used, such as one or more permanent magnets. A combination of one or more coils and one or more permanent magnets may also be employed, although that may add unneeded complexity. Coil 104 is positioned within coil annulus 108. Coil annulus 108 is defined by a generally cylindrical outer wall having an outer wall diameter and a concentric generally cylindrical inner wall having an inner wall diameter, wherein the diameter of the outer wall is greater than the diameter of the inner wall. Generally cylindrical outer wall and generally cylindrical inner wall are each generally parallel to a tubular longitudinal axis (LA). Coil annulus 108 is further defined by front and back end plates connecting the generally cylindrical outer wall and the generally cylindrical inner wall at their peripheral edges.

Other system embodiments may include non-telescoping detector shoe supports, which may have a rectangular, circular, or other cross-sectional shape. Certain system embodiments may include provision of quick-acting (Q-A) couplings 122 that allow detector shoes 30 to be removably installed and removed, as well as a second set of Q-A couplings for removably installing and changing to different length non-telescoping detector shoe supports. Yet other system embodiments may have an iris mechanism, explained more fully in assignee's U.S. patent application Ser. No. 16/987,211, filed Aug. 6, 2020, where the iris comprises a number of leaves with brackets allowing addition of detector shoes 30 to the iris leaves. In certain embodiments, detector shoes 30 may attach directly to the iris leaves, such as by molding them integrally with the leaves, or by interference fittings. The leaves are so shaped that movement of the leaves results in the iris aperture closing, and the detector shoes moving toward the tubular being inspected. The aperture, and thus detector shoes, may be opened, or placed in any desired position, by the positioning of a handle. In alternative embodiment the handle may be connected to an operating actuator, for example an electric motor, which may be electronically controlled. The iris mechanism as described may also be used in a dual plane iris of the known type, which may allow addition detector shoes and/or sensors to be utilized.

Systems in accordance with the present disclosure may further comprises a tubular conveyor sub-system, as more fully described in assignee's U.S. Pat. No. 11,402,351, on which a plurality of tubular members P1, P2, P3 . . . PN may traverse before and after being inspected at one of the inspection apparatus of the present disclosure. Such systems may comprise one or more actuators adapted to pick up a tubular member being inspected (employing manipulators arms and pipe grippers) and insert tubular member into an inspection apparatus, the one or more actuators selected from the group consisting of pneumatic, hydraulic, and electronic actuators, and combination thereof. In certain embodiments actuator or actuators may be robotic actuators, such as the IRB 7600 industrial robot, available from ABB Asea Brown Boveri Ltd. Simple cranes or other pipe lifting equipment known in the OCTG inspection industry may also be employed. Actuators may be floor mounted, cabinet-mounted, or roof-mounted. In certain embodiments the actuator(s) should have capacity to lift standard lengths of steel pipe.

As noted herein, certain system embodiments may include one or more quick-acting couplings selected from the group consisting of ball-lock couplings, roller-lock couplings, pin-lock couplings, flat-faced couplings, bayonet couplings, ring-lock couplings, cam-lock couplings, multi-tube connectors, and combinations thereof. These features are further described in assignee's co-pending U.S. patent application Ser. No. 16/987,211, filed Aug. 6, 2020. The choice of a particular material for the Q-A couplings is dictated among other parameters by the vibration and degree of expected twisting motion of the inspection shoes expected during use of EMI apparatus, temperature, an expected humidity and other environmental conditions.

In certain embodiments, the generally arcuate body (2) may comprise a plastic material, and that plastic material may be a rigid plastic material. Rigid plastic materials suitable for use in the EMI shoes of the present disclosure are many, but a few examples are provided here. The rigid plastic materials known under the trade designation NYLOIL, available from Cast Nylons Ltd., Willoughby, Ohio (U.S.A.) are one suitable rigid plastic material. These materials comprise an internally homogeneously lubricated, high-strength polyamide polymer and an internal lubricant. In certain embodiments these plastic materials comprise a filler promoting higher crystallinity in the internally homogeneously lubricated, high-strength polyamide polymer. In certain embodiments the filler is molybdenum disulfide present at a weight percentage ranging from about 0.1 to about 3 weight percent. In certain embodiments the internally homogeneously lubricated, high-strength polyamide polymer comprises from about 2 to about 8 percent by weight of one or more internal lubricants. In certain embodiments the internal lubricant may be zinc, diheptoxy-sulfanylidene-sulfido-λ5-phosphane.

The rigid plastic materials known under the trade designation NYLOIL have a flexural strength ranging from about 14,000 to about 16,000 psi in accordance with ASTM D790; a flexural strength ranging from about 15,500 to about 16,000 psi in accordance with ASTM-D790; a flexural modulus ranging from about 375,000 to about 475,000 psi in accordance with ASTM-D790; and a flexural modulus ranging from about 425,000 to about 475,000 psi in accordance with ASTM-D790 when incorporating the molybdenum disulfide filler.

Other rigid, internally lubricated (oil filled) cast polyamide plastic materials that may be suitable for use as the body 2 of the EMI shoes of the present disclosure include those known under the trade designations SUSTAMID 6G OL (available from Röchling), NYLATRON LIG (available from Quadrant Engineering Plastic Products), TECAST 6PAL (available from Ensinger), ZL 1100 oil (available from ZL Engineering Plastics), UNIPA MLO (available from Nytef), NYLATECH OIL (available from Nylatech, Inc.), NYCAST (available from Cast Nylons, Ltd.).

Other plastic materials that may be suitable for use as the body 2 of the EMI shoe include acetal polymers, acrylic polymers, phenolic polymers, polyimide polymers, PEEK (polyetheretherketone) polymers, polycarbonate polymers, polystyrene polymers, and the like, and mixtures, combinations, and layered versions of one or more of these polymeric materials. Any of these may include fillers, such as glass fibers, aramid fibers, and the like, coupling agents, dyes, and the like.

The materials of construction of body may comprise any moldable or printable plastic (polymeric) material, or ceramic material, or metallic material, or combination thereof. The shoe body may comprise a single material, or combination of materials. The members may comprise more than one layer of material, and each layer may be the same or different. The polymeric materials may be filled with various fillers, extenders, pigments, and other additives. In embodiments consisting essentially of moldable polymeric material, these fillers, extenders, pigments, and other additives may be present in limited amounts to the extent necessary to substantially exceed minimum safety and effectiveness standards. Suitable polymeric materials include thermoplastics, thermosetting polymers, elastomers, and thermoplastic elastomers. The polymeric materials may comprise co-polymers, ter-polymers, and blends of two or more chemical types of polymers, or blends of two or more polymers of the same chemical type, for example, a blend of two thermoplastics having different molecular weights.

Examples of specific polymers include light-curable polymer-based resins, polyacrylics, polyvinyls, polyvinyl alcohols, PTFE, e-PTFE, polypropylene, polyurethane, polycarbonate, polyethylene terephthalate, polyvinylidene fluoride, and combinations thereof, and the like. Other possible material examples include non-magnetic metals such as aluminum, copper, lead, tin, titanium, tantalum, zinc, brass, and bronze, combinations and mixtures thereof, and the like.

In embodiments comprising a single solid body, the body may be molded as illustrated schematically in the various figures using special molds, or may be made using additive manufacturing methods, such as 3D printing. In certain embodiments, one or more molding or printing steps may be required to build up the devices to functional length and diameter. Also, the methods may include printing steps featuring specific polymers, colors, shapes, software, and the like. 3D printers that may be useful are the 3D printers known under the trade designation Formlabs Form 3B+ and 3BL, available from Formlabs, Millbury, Ohio (USA).

Various components, such as device bodies, as described herein may be made using a variety of additive and/or subtractive processes, including molding, machining, stamping and like additive processes, and/or subtractive processes such as net-shape casting (or near-net shape casting) using rapid prototype (RP) molds. Net-shape or near-net shape casting methods of making a variety of molds for producing a variety of complex products are summarized in patents assigned to 3D Systems, Inc., Rock Hill, South Carolina, U.S.A., for example U.S. Pat. No. 8,285,411. As summarized in the '411 patent, a number of technologies presently exist for the rapid creation of models, prototypes, and objects for limited run manufacturing. These technologies are generally called Solid Freeform Fabrication ("SFF") techniques. Some SFF techniques include stereolithography, selective deposition modeling, laminated object manufacturing, selective phase area deposition, multi-phase jet solidification, ballistic particle manufacturing, fused deposition modeling, particle deposition, laser sintering, film transfer imaging, and the like. Generally, in SFF, complex parts are produced from a build material in an additive fashion as opposed to conventional fabrication techniques, which are generally subtractive in nature. For example, in most conventional subtractive fabrication techniques material is removed by machining operations or shaped in a die or mold to near net shape and then trimmed. In contrast, additive fabrication techniques incrementally add portions of a build material to targeted locations, layer by layer, in order to build a complex part. SFF technologies typically utilize a computer graphic representation of a part and a supply of a build material to fabricate the part in successive layers. According to the '411 patent, SFF technologies may dramatically shorten the time to develop prototype parts, can produce limited numbers of parts in rapid manufacturing methods, and may eliminate the need for complex tooling and machining associated with conventional subtractive manufacturing methods, including the need to create molds for custom applications. In addition, customized parts can be directly produced from computer graphic data (e.g., computer-aided design (CAD) files) in SFF techniques. Generally, in most techniques of SFF, structures are formed in a layer by layer manner by solidifying or curing successive layers of a build material. For example, in stereolithography a tightly focused beam of energy, typically in the ultraviolet radiation band, is scanned across sequential layers of a liquid photopolymer resin to selectively cure resin of each layer to form a multilayered part. In selective laser sintering, a tightly focused beam of energy, such as a laser beam, is scanned across sequential layers of powder material to selectively sinter or melt powder (such as a metal or ceramic powder) in each layer to form a multilayered part. In selective deposition modeling, a build material is jetted or dropped in discrete droplets, or extruded through a nozzle, such that the build material becomes relatively rigid upon a change in temperature and/or exposure to actinic radiation in order to build up a three-dimensional part in a layerwise fashion. In another technique, film transfer imaging ("FTI"), a film transfers a thin coat of resin to an image plane area where portions of the resin corresponding to the cross-sectional layer of the part are selectively cured with actinic radiation to form one layer of a multilayer part. Certain SFF techniques require the part be suspended from a supporting surface such as a build pad, a platform, or the like using supports that join the part to the supporting surface. Prior art methods for generating supports are described in U.S. Pat. Nos. 5,595,703; 6,558,606; and 6,797,351. The Internet website of Quickparts.com, Inc., Atlanta, GA, a subsidiary of 3D Systems Inc., has more information on some of these techniques and materials that may be used.

Methods of making apparatus of the present disclosure using additive manufacturing may comprise scanning a user's rectal cavity employing a laser scanning appliance to produce a pointcloud image of a user's rectum, uploading the pointcloud image to a computer having one or more design software programs loaded thereon or available remotely through an Internet connection, and producing a software version of apparatus from the pointcloud image. The software version of the device may then be uploaded to a 3D printer, followed by 3D printing the device or portions thereof. Laser scanning images is a well-established practice in the medical industry. See for example the laser scanners available from Laser Design, Minneapolis, Minnesota (U.S.A.). See also U.S. Pat. Nos. 7,184,150; 7,153,135; and 9,522,054. In some cases, a 3D rendering may be made from a 2D image, such as a photograph or 2D drawing. See for example U.S. Pat. Nos. 8,165,711 and 8,605,136. Intraoral imaging equipment, CAD/CAM and imaging analysis software are available from various sources, including 3Shape, Renishaw, 3M, and others.

The skilled artisan, having knowledge of the particular application, environmental conditions, and available materials, will be able design the most cost effective, safe, and operable EMI shoes and systems for each particular application without undue experimentation.

Figure 12:
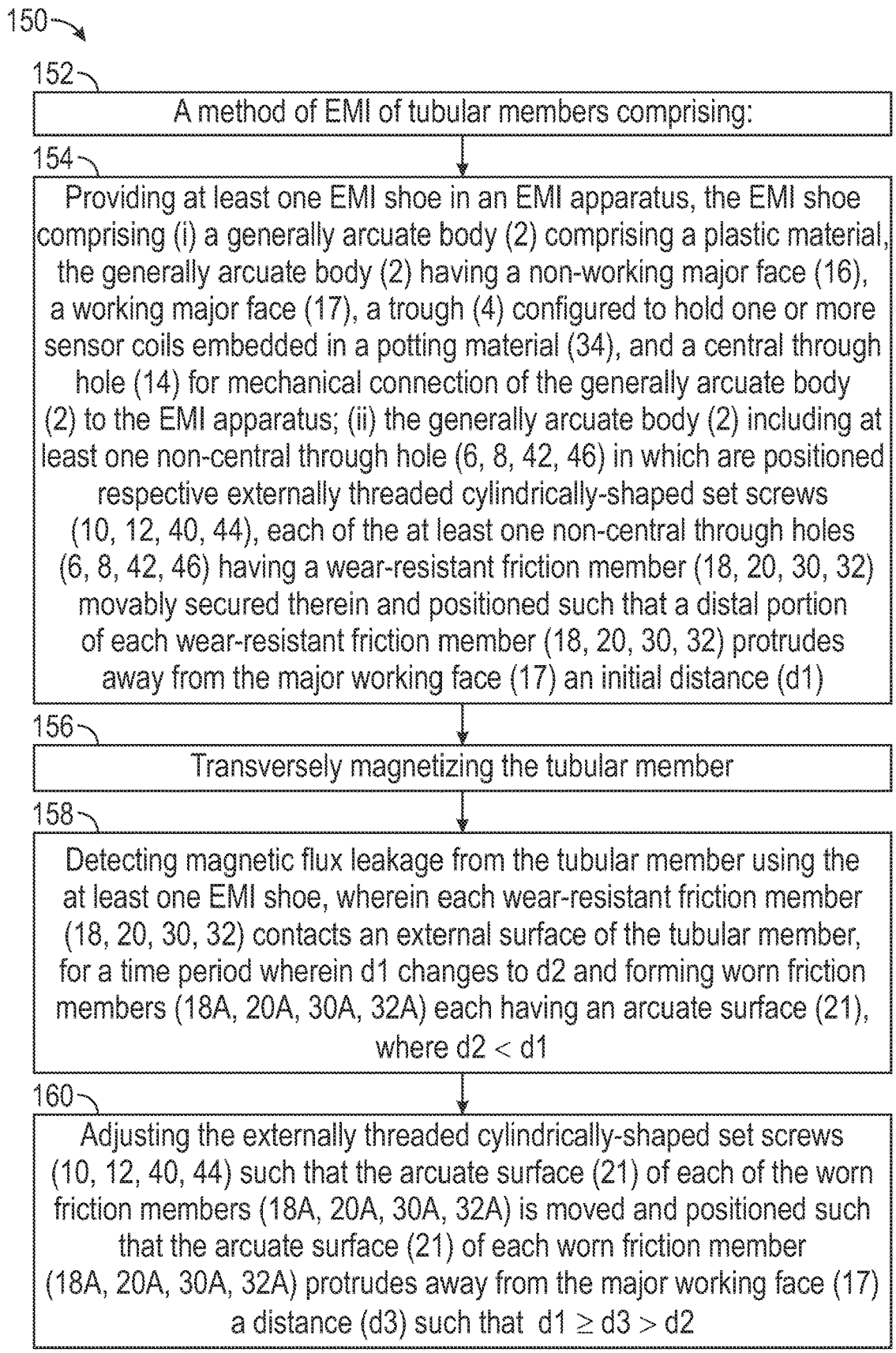
FIG. 12 is a logic diagram of one method of inspecting pipe or other OCTG in accordance with the present disclosure.

FIG. 12 is a logic diagram of one method embodiment 150 of EMI inspecting pipe or other OCTG in accordance with the present disclosure. Method embodiment 150 comprises (Boxes 152 and 154) providing at least one EMI shoe in an EMI apparatus, the EMI shoe comprising:
  (i) a generally arcuate body (2) having a non-working major face (16), a working major face (17), a trough (4) configured to hold one or more sensor coils embedded in a potting material (34), and a central through hole (14) for electronic connection to the rigid, generally arcuate body (2);
  (ii) the generally arcuate body (2) including at least one non-central through hole (6, 8, 42, 46) in which are positioned respective externally threaded cylindrically-shaped set screws (10, 12, 40, 44), each of the at least one non-central through holes (6, 8, 42, 46) having a wear-resistant friction member (18, 20, 30, 32) movably secured therein and positioned such that a distal portion of each wear-resistant friction member (18, 20, 30, 32) protrudes away from the major working face (17) an initial distance (d1) (Box 154).

Method embodiment 150 further comprises magnetizing the tubular member (Box 156).

Method embodiment 150 further comprises detecting magnetic flux leakage from the tubular member using the at least one EMI shoe, wherein each wear-resistant friction member (18, 20, 30, 32) contacts an external surface of the tubular member, for a time period wherein d1 changes to d2 and forming worn friction members (18A, 20A, 30A, 32A) each having an arcuate surface (21) (Box 158).

Method 150 further comprises adjusting the externally threaded cylindrically-shaped set screws (10, 12, 40, 44) such that the arcuate surface (21) of each of the worn friction members (18A, 20A, 30A, 32A) is moved and positioned such that the arcuate surface (21) of each worn friction member (18A, 20A, 30A, 32A) protrudes away from the major working face (17) a distance (d3) such that $d1 \geq d3 > d2$ (Box 160).

An on-board power unit may be included in certain system embodiments for powering the magnetic flux generator(s), which may be a permanent or rechargeable battery pack or transformer for electrical power, or both. An on-board electronics package may include one or more microprocessors, a communications link (wired or wireless), and/or an on-board controller. A CRT, LED or other human-machine interface may be included on or in a workstation cabinet in certain embodiments.

Magnetic flux generator(s) 104, detector shoes 30, and pinch rollers 130 may, in certain embodiments, be powered from within via an instrument display or other human/machine interface (HMI), for example using batteries, Li-ion or other type. In other embodiments display/HMI may be powered from an instrument cable providing power, perhaps by a local generator, or grid power. The display/HMI allows an operator to interface with the instrument. In certain embodiments the operator will be able to take measurements, view or read these measurements and reset the instrument for subsequent measurement taking. If the display/HMI is connected to a power cable, then measurements may be taken remotely, stored and reset as necessary.

What has not been recognized or realized are EMI shoes, systems, and methods to inspect OCTG, especially with a combination of magnetic flux detectors and eddy current detectors, or only with magnetic flux detectors, using EMI shoes described herein. EMI shoes, systems, and methods to increase pipe production without significant risk to workers is highly desirable.

It will be apparent that in other embodiments, the various components need not have the shapes illustrated in the various drawing figures, but rather could take any shape. For example, the wear-resistant members could have a box or cube shape, elliptical, triangular, pyramidal (for example, three or four sided), prism-shaped, hemispherical or semi-hemispherical-shaped (dome-shaped), or combination thereof and the like, as long as the apparatus is capable of setting off the working major face of the EMI shoes from the external tubular surface. EMI shoe bodies and wear-resistant members could be made of other materials than mentioned herein. It will be understood that such embodiments are part of this disclosure and deemed with in the claims.

From the foregoing detailed description of specific embodiments, it should be apparent that patentable apparatus, systems, and methods have been described. Although specific embodiments of the disclosure have been described herein in some detail, this has been done solely for the purposes of describing various features and aspects of the apparatus, systems, and methods, and is not intended to be limiting with respect to their scope. It is contemplated that various substitutions, alterations, and/or modifications, including but not limited to those implementation variations which may have been suggested herein, may be made to the described embodiments without departing from the scope of the appended claims. For example, other arrangements of wear-resistant members on the EMI shoes than those illustrated and described herein are considered with the present disclosure.

What is claimed is:

1. An electromagnetic inspection (EMI) shoe comprising:
   (a) a generally arcuate body (2) having a non-working major face (16), a working major face (17), a trough (4) configured to hold one or more sensor coils embedded in a potting material (34), and at least one through hole (14) for mechanical connection of the generally arcuate body (2) to an EMI apparatus;
   (b) the generally arcuate body (2) including at least one non-central through hole (6, 8, 42, 46) in which are positioned respective adjustable externally threaded cylindrically-shaped set screws (10, 12, 40, 44), each of the at least one non-central through holes (6, 8, 42, 46) having a wear-resistant friction member (18, 20, 30, 32) movably secured therein and positioned such that a distal portion of each wear-resistant friction member (18, 20, 30, 32) protrudes away from the major working face (17) an initial distance (d1) and configured to wear down over time to a generally arcuate surface (21) that is a distance d2 from the major working face (17), where d2<d1, forming worn friction members (18A, 20A, 30A, 32A), the adjustable externally threaded cylindrically-shaped set screws (10, 12, 40, 44) configured to be advanced further into the generally arcuate body (2) and thus advance the generally arcuate surface (21) to a distance d3, where d1≥d3>d2.

2. The EMI shoe of claim 1 wherein the generally arcuate body (2) comprises plastic material comprising an internally homogeneously lubricated, high-strength polyamide polymer.

3. The EMI shoe of claim 2 wherein the plastic material consists essentially of an internally homogeneously lubricated, high-strength polyamide polymer.

4. The EMI shoe of claim 2 wherein the plastic material consists of an internally homogeneously lubricated, high-strength polyamide polymer.

5. The EMI shoe of claim 2 wherein the plastic material comprises a filler promoting higher crystallinity in the internally homogeneously lubricated, high-strength polyamide polymer.

6. The EMI shoe of claim 5 wherein the filler is molybdenum disulfide present at a weight percentage ranging from about 0.1 to about 3 weight percent.

7. The EMI shoe of claim 2 wherein the internally homogeneously lubricated, high-strength polyamide polymer comprises from about 2 to about 8 percent by weight of an internal lubricant.

8. The EMI shoe of claim 7 wherein the internal lubricant is zinc, diheptoxy-sulfanylidene-sulfido-λ5-phosphane.

9. The EMI shoe of claim 2 wherein the internally homogeneously lubricated, high-strength polyamide polymer has a flexural strength ranging from about 10,000 to about 20,000 psi in accordance with ASTM D790.

10. The EMI shoe of claim 2 wherein the internally homogeneously lubricated, high-strength polyamide polymer has a flexural strength ranging from about 14,000 to about 16,000 psi in accordance with ASTM-D790.

11. The EMI shoe of claim 2 wherein the internally homogeneously lubricated, high-strength polyamide polymer has a flexural modulus ranging from about 300,000 to about 500,000 psi in accordance with ASTM-D790.

12. The EMI shoe of claim 2 wherein the internally homogeneously lubricated, high-strength polyamide polymer has a flexural modulus ranging from about 425,000 to about 475,000 psi in accordance with ASTM-D790.

13. The EMI shoe of claim 1 wherein the generally arcuate body (2) comprises at least one generally non-magnetic metal selected from aluminum, copper, lead, tin, titanium, tantalum, zinc, brass, and bronze, and combinations and mixtures thereof.

14. The EMI shoe of claim 1 wherein the externally threaded cylindrically-shaped set screws are selected from the group consisting of slotted set screws, socket set screws, square drive set screws, hex drive threaded set screws.

15. The EMI shoe of claim 14 wherein the externally threaded cylindrically-shaped set screws are steel having a tensile strength ranging from about 50,000 psi to about 150,000 psi in accordance with ASTM E8/E8M and/or A370.

16. The EMI shoe of claim 15 wherein the externally threaded cylindrically-shaped set screws are self-locking and at least a portion of the external threads have an adhesive thereon that activates immediately after installation, locking the self-locking thread set screws into place and sealing against liquids and gases.

17. The EMI shoe of claim 15 wherein the externally threaded cylindrically-shaped set screws are self-locking and at least a portion of the external threads have a polyamide coating thereon that melts during installation and hardens thereafter, locking the self-locking thread set screws into place and sealing against liquids and gases.

18. The EMI shoe of claim 1 wherein each of the wear-resistant friction members (18, 20, 30, 32) have a Vickers microhardness of at least about 700 (ASTM E384-89), modulus of elasticity of at least about 150 (at least about 21,800) (ASTM C674-88), a flexural strength of at least about 275 MPa (at least about 39900 psi) (ASTM C674-88), compressive strength of at least about 1200 MPa (at least about 173,000 psi) (ASTM C773-88), and a fracture toughness of at least about 2.5 MPa-m$^{1/2}$ (at least about 2.3 ksi-in$^{1/2}$) (Vickers indentation).

19. The EMI shoe of claim 18 wherein each of the wear-resistant friction members (18, 20, 30, 32) is aluminum oxide.

20. The EMI shoe of claim 1 wherein each of the wear-resistant friction members (18, 20, 30, 32) is secured in the one or more non-central through holes (6, 8, 42, 46) by friction fitting.

21. The EMI shoe of claim 1 wherein each of the wear-resistant friction members (18, 20, 30, 32) has a shape independently selected from the group consisting of spherical ball, oval ball, cylindrical pin, and cylindrical button.

22. A method of EMI of tubulars, comprising:
   (a) providing at least one EMI shoe of claim 1 in an EMI apparatus, where a distal portion of each wear-resistant friction member (18, 20, 30, 32) protrudes away from the major working face (17) an initial distance (d1);
   (b) magnetizing the tubular member during step (a);
   (c) detecting magnetic flux leakage from the tubular member using the at least one EMI shoe during steps (b) and (c), wherein each wear-resistant friction member (18, 20, 30, 32) contacts an external surface of the tubular member, for a time period wherein d1 changes to d2 and forming worn friction members (18A, 20A, 30A, 32A) each having an arcuate surface (21), where d2<d1; and d) adjusting the externally threaded cylindrically-shaped set screws (10, 12, 40, 44) such that arcuate surface (21) of each of the worn friction members (18A, 20A, 30A, 32A) are moved and positioned such that the arcuate surface (21) of each worn friction member (18A, 20A, 30A, 32A) protrudes away from the major working face (17) a distance (d3) such that d1≥d3>d2.

23. The method of claim 22 wherein the magnetic flux leakage is detected by the one or more sensors spaced so that their respective magnetic fields abut and provide a minimum of 100 percent inspection of the tubular member.

24. A tubular member EMI apparatus comprising:
   (a) at least one magnetic flux generator (104) contained in a coil annulus (108) and a detector assembly (106) supported by the coil annulus (108);
   (b) the coil annulus (108) and the detector assembly (106) each having inlet and outlet openings (110, 112) for passing a tubular member (2) there through, the detector assembly (106) having one or more magnetic detectors (116) (magnetic, eddy current, or both) configured to be spaced a first distance from the tubular member (2) during an inspection; and
   (c) the one or more magnetic detectors (116) each contained in one or more EMI detector shoes (30), the one or more EMI detector shoes (30) comprising:
      (i) a generally arcuate body (2) having a non-working major face (16), a working major face (17), a trough (4) configured to hold one or more sensor coils embedded in a potting material (34), and at least one through hole (14) for mechanical connection of the EMI detector shoes (30) to the EMI apparatus;
      (ii) the generally arcuate body (2) including at least one non-central through hole (6, 8, 42, 46) in which are positioned respective externally threaded cylindrically-shaped set screws (10, 12, 40, 44), each of the at least one non-central through holes (6, 8, 42, 46) having a wear-resistant friction member (18, 20, 30, 32) movably secured therein and positioned such that a distal portion of each wear-resistant friction member (18, 20, 30, 32) protrudes away from the major working face (17) an initial distance (d1) and configured to wear down over time to a generally arcuate surface that is a distance d2 from the major working face (17), where d2<d1, forming worn friction members (18A, 20A, 30A, 32A), the adjustable externally threaded cylindrically-shaped set screws (10, 12, 40, 44) configured to be advanced further into the generally arcuate body (2) and thus advance the generally arcuate surface (21) to a distance d3, where d1≥d3>d2.

\* \* \* \* \*

UNITED STATES PATENT AND TRADEMARK OFFICE
CERTIFICATE OF CORRECTION

| | | |
|---|---|---|
| PATENT NO. | : 12,247,948 B1 | Page 1 of 1 |
| APPLICATION NO. | : 18/186843 | |
| DATED | : March 11, 2025 | |
| INVENTOR(S) | : Danny Uselton | |

It is certified that error appears in the above-identified patent and that said Letters Patent is hereby corrected as shown below:

In the Specification

In the Detailed Description, Column 17, Lines 27-28:
-a user's rectal cavity-

Should be changed to:
--an EMI device--

In the Detailed Description, Column 17, Line 29:
-a user's rectum-

Should be changed to:
--the EMI device--

In the Detailed Description, Column 17, Lines 42-43:
-Intraoral imaging-

Should be changed to:
--Imaging--

Signed and Sealed this
Eighth Day of April, 2025

Coke Morgan Stewart
*Acting Director of the United States Patent and Trademark Office*